United States Patent
Ghazaei Ardakani et al.

(10) Patent No.: US 11,305,431 B2
(45) Date of Patent: Apr. 19, 2022

(54) SYSTEM AND METHOD FOR INSTRUCTING A ROBOT

(71) Applicant: COGNIBOTICS AB, Lund (SE)

(72) Inventors: M. Mahdi Ghazaei Ardakani, Lund (SE); Klas Nilsson, Lund (SE)

(73) Assignee: COGNIBOTICS AB, Lund (SE)

( * ) Notice: Subject to any disclaimer, the term of this patent is extended or adjusted under 35 U.S.C. 154(b) by 304 days.

(21) Appl. No.: 16/348,137

(22) PCT Filed: Nov. 8, 2017

(86) PCT No.: PCT/EP2017/078558
§ 371 (c)(1),
(2) Date: May 7, 2019

(87) PCT Pub. No.: WO2018/087123
PCT Pub. Date: May 17, 2018

(65) Prior Publication Data
US 2019/0358817 A1  Nov. 28, 2019

(30) Foreign Application Priority Data
Nov. 10, 2016  (EP) .................... 16198208

(51) Int. Cl.
*B25J 13/02*   (2006.01)
*B25J 13/08*   (2006.01)
(Continued)

(52) U.S. Cl.
CPC ........... *B25J 9/1689* (2013.01); *B25J 13/025* (2013.01); *B25J 13/085* (2013.01);
(Continued)

(58) Field of Classification Search
CPC . B25J 9/16; B25J 9/1656; B25J 9/1671; B25J 9/1679; B25J 9/1689; B25J 13/00;
(Continued)

(56) References Cited

U.S. PATENT DOCUMENTS

| 6,424,885 B1 * | 7/2002 | Niemeyer | A61B 34/70 600/109 |
| 9,855,653 B2 * | 1/2018 | Kanaoka | B25J 3/04 |
| 2015/0066051 A1 * | 3/2015 | Kwon | B25J 3/04 606/130 |

FOREIGN PATENT DOCUMENTS

| CN | 101610721 A | 12/2009 |
| CN | 104758055 A | 7/2015 |
| CN | 105101903 A | 11/2015 |

OTHER PUBLICATIONS

Yokokohji, "Bilateral Control of Master-Slave Manipulators for Ideal Kinesthetic Coupling-Formulation and Experiment", 1994 (Year: 1994).*

(Continued)

*Primary Examiner* — Khoi H Tran
*Assistant Examiner* — Sarah A Tran
(74) *Attorney, Agent, or Firm* — Klein, O'Neill & Singh, LLP

(57) ABSTRACT

The disclosure relates to a system (1) and method for instructing a robot. The system (1) comprising an immersive haptic interface, such that operator interaction with a master robot arm (2) is reflected by a slave robot arm (3) arranged for interaction with a workpiece (4). The interaction of the slave robot arm (3) is reflected back to the master robot arm (2) as haptic feedback to the operator. The dynamic system is continually simulated forward and new commands are calculated for the master robot arm and the slave robot arm.

25 Claims, 4 Drawing Sheets

(51) Int. Cl.
  *B25J 9/16* (2006.01)
  *G05B 19/4155* (2006.01)
(52) U.S. Cl.
  CPC ......... *G05B 19/4155* (2013.01); *B25J 9/1671* (2013.01); *G05B 2219/40144* (2013.01); *G05B 2219/40182* (2013.01)
(58) Field of Classification Search
  CPC . B25J 13/02; B25J 13/025; B25J 13/08; B25J 13/085; G05B 19/4155; G05B 2219/40144; G05B 2219/40182; G05B 2219/40184; G05B 2219/40194
  See application file for complete search history.

(56) References Cited

OTHER PUBLICATIONS

International Search Report on corresponding PCT application (PCT/EP2017/078558) from International Searching Authority (EPO) dated Jul. 6, 2018.
Written Opinion on corresponding PCT application (PCT/EP2017/078558) from International Searching Authority (EPO) dated Jul. 6, 2018.
Alcocer et al.; "Force Estimation and Control in Robot Manipulators"; Elsevier IFAC Publications; Proc. 7$^{th}$ IFAC Symposium on Robot Control 2003 (SYROCO'03), Wroclaw, Poland; vol. 1, p. 55; Sep. 1-3, 2004.
Billard et al.; "Springer Handbook of Robotics", 2nd ed., Chapter "Learning from Humans"; pp. 1995-2014, 2016.
Borghesan et al.; "A constraint-based programming approach to physical human-robot interaction"; Robotics and Automation (ICRA), 2012 IEEE International conference May 14-18, 2012.
Daly et al.; "Bilateral teleoperation using unknown input observers for force estimation"; American Control Conference, 2009; ACC '09, IEEE; Piscataway, NJ, USA; p. 89-95; Jun. 10, 2009.
Hacksel et al.; "Estimation of environment forces and rigid-body velocities using observers"; from Proc. IEEE Int. Conf. Robotics and Automation (ICRA); San Diego, CA; pp. 931-936; May 8-13, 1994.
Li et al., "Bilateral Teleoperation of Holonomic Constrained Robotic Systems With Time-Varying Delays"; IEEE Transactions on Instrumentation and Measurement; IEEE Service Center; Piscataway, NJ, US; vol. 62, No. 4; p. 752-765; Apr. 1, 2013.
Turro et al., "Haptically Augmented Teleoperation"; Proceedings of the 2001 IEEE International Conference on Robotics and Automation; ICRA 2001; Seoul, Korea; p. 386-392; May 21-26, 2001.
Van Damme et al.; "Estimating robot end-effector force from noisy actuator torque measurements"; IEEE International Conference Robotics and Automation (ICRA); Shanghai, China; pp. 1108-1113; May 9-11, 2011.
Yokokohji et al.; "Bilateral Control of Master-Slave Manipulators for Ideal Kinesthetic Coupling-Formulation and Experiment"; IEEE Transactions on Robotics and Automation; IEEE Inc.; New York, US; vol. 10, No. 5; p. 605-619; Oct. 1, 1994.

* cited by examiner

SYSTEM AND METHOD FOR INSTRUCTING A ROBOT

FEDERALLY SPONSORED RESEARCH OR DEVELOPMENT

Not Applicable

CROSS-REFERENCE TO RELATED APPLICATION

This application is the National Phase, under 35 U.S.C. § 371(c), of International Application No. PCT/EP2017/078558, filed Nov. 8, 2017, which claims priority from EP 16198208.7, filed Nov. 10, 2016. The disclosures of all of the referenced applications are incorporated herein by reference in their entirety.

TECHNICAL FIELD

The present disclosure relates to technology for robots, and in particular to a method and a system for instructing a robot in an intuitive way by force interaction. An operator may use intuitive commands for defining a task of the robot, such as a robot moving an end-effector in contact with a workpiece, in an immersive manner based on haptics and control of multiple arms.

BACKGROUND

It is a most common case that robot motions are to be carried out in physical contact with the environment, with a well-defined interaction force. In specific configurations it is well known how to specify and control such motions. However, needs for flexibility and productivity also call for motion definitions to be portable with respect to physical arrangements and choice of equipment, and there are needs for intuitive commands thus permitting non-expert operators, without qualified engineering of each specific application.

A robot is here defined as a programmable manipulator with one or several arms, each arm optionally being equipped with one or several end-effectors, and the joints of the one or several arms being controlled by a controller. Robots have found wide application in many areas of industry. Some industrial areas involve labour dangerous to human health or labour performed under conditions not possible for humans to withstand. Other areas of industry involve repetitive tasks which can be performed much more efficiently and precisely by a robot.

Robots can be programmed on a system level by the robot provider, using some computer programming language. Normally, one part of the system or controller is an interpreter of user programs, which are written in some robot programming language that is defined by that interpreter. These end-user programs are referred to as robot programs. A robot program is formed by instructions that can be interpreted. Equivalently for the following, robot programs can be compiled, and different combinations of system level and user level programs can be utilized.

A robot program can be written by hand in plain text, they can be defined in graphical 3D environments, they may be generated from CAD/CAM systems, they can be instructed using manual guidance of a manipulator, or by some combination of these and any other possible technique. Combinations are appropriate since certain types of instructions may be easier to define with a specific technique. Instructions that upon execution result is physical effects such as end-effector motions are of particular interest for efficient usage of robots.

For force interaction, such as in assembly applications, the desired motion often depends on unmodeled physical behaviour that is best observed/experienced by the production engineer who is operating the robot. How to transfer the operator experience-based intent to the corresponding set of robot instructions has for some time been subject to extensive research. Ideally, robot programs define the intended task to be performed by the robot. Practically today, a robot performing programmed instructions result in calls to functions of the controller that controls the joints of the robot such that the end-effector performs an actual motion as part of the task, but the program needs ad-hoc modifications since the available instruction set of the controller mainly provides means of secondary effects.

Such a secondary effect can be an implicitly programmed position deviation resulting in a desired end-effector force, rather than directly performing a force-controlled motion with instruction parameters expressing the intent of the operator. One reason for this unfortunate situation is that robot programming and control functions are traditionally based on position-controlled motions, which operate in free space or with the end-effector being in contact with the workpiece. That is, even in the case of a desired contact force between the robot and its environment, the motion definition is based on programmed positions, with the resulting force being a secondary effect from positions that bring objects in contact with each other. The motions being position based, either on user or on system level of the control, has the advantage that control functions are easier to provide and support as packaged control features that can be verified without specifics of the environment such as the stiffness of the force contact. The disadvantage can be that the forces as secondary effects can be more difficult to specify and to control with reasonable bandwidth.

To accomplish appropriate control of the contact forces, a variety of control schemes have been developed. Force sensors and force estimation techniques are becoming commonplace technologies to facilitate such control. Special attention has been paid to the transition between contact and noncontact situations. Also the dependency on kinematic structure of the robot manipulator has been an obstacle for industrial applicability, but during the last decade several products capable of up to 6D force/torque-controlled end-effector motions have appeared on the market.

One common approach to robot task definition is to program a virtual robot of the same type as the physical one. This is typically done in some programming tool with 3D graphics. Interaction-forces are, however, not handled in such programming environments, so programming of robots involving physical interactions with the environment is time consuming and requires hours of engineering, comprising repeated tests on the physical system.

Another approach is to equip a single-arm robot with another force-sensing device that is used to command the motions, both for position control and for force control. However, there are many situations where usual single-arm lead-through programming is impractical or undesired:

- Due to safety restrictions (grinding tools, press machines, etc.) it may not be possible to stay close to the robot.
- The workspace may be cluttered such that a human cannot enter.
- The coupling between the operator and the manipulator may change the nature of the task.

In "A constraint-based programming approach to physical human-robot interaction" by Gianni Borghesan et al, Robotics and Automation (ICRA), 2012 IEEE International conference 14-18 May 2012, a constraint based approach to the design of teleoperation system has been considered. That article represents state-of-the-art, the approach being purely kinematic, while force interplay in most applications are more related to dynamics. Thus, there is still need for improvements to also reflect dynamics of the system.

SUMMARY

It is an object of the present disclosure to alleviate at least some of the limitations of existing technologies. It is a further object of the disclosure to enable a practical and efficient teaching of robot motions that are to exhibit a well-defined force interaction with workpieces. For such efficient teaching, the robot instructor/programmer should not be distracted by system restrictions that are not part of the task at hand or that are hard to understand from appearance of the equipment/robot that is used. For such a system to be maintained for widespread industrial usage, the implementation should be model-based and allow incorporation of new mechanics without re-programming.

These objects and others are at least partly achieved by the system and method according to the independent claims, and by the embodiments according to the dependent claims.

According to one aspect, the disclosure proposes a system for instructing a robot. The system comprises a master robot arm arranged for being influenced by operator interaction and a slave robot arm arranged for interaction with a workpiece. The system also comprises a control unit configured to determine master external force data indicating a force interplay between the operator and the master robot arm, and to determine slave external force data indicating a force interplay between the slave robot arm and the workpiece. The control unit further comprises a haptic interface module comprising a constraint submodule defining a coupling, namely a kinematic coupling, between a designated master coupling frame of the master robot arm and a designated slave coupling frame of the slave robot arm such that a velocity of the master coupling frame and a velocity of the slave coupling frame are interrelated. The haptic interface module also comprises a calculation submodule, e.g. a solver submodule, configured to calculate a joint movement command for the master robot arm and a joint movement command for the slave robot arm, based on the master external force data, the slave external force data, a model, i.e. a dynamic model, of the master robot arm, a model, i.e. a dynamic model, of the slave robot arm, and a relation between the dynamic models including forces/torques for accomplishing the kinematic coupling, while constraints imposed by the dynamic models are respected. The system is further configured to control the master robot arm and the slave robot arm according to the joint movement commands. The operator will then receive haptic feedback from the force interplays reflecting dynamics of the system. A command may relate to an instruction, but it may also be a time-series of set-points provided as reference to the servo control according to a trajectory generator or any other computations. The system is further configured to record resulting movement of a frame related to the slave robot arm, and to record resulting/applied force to the workpiece in the same frame. This frame may be a Tool Centre Point (TCP) frame, an end flange frame, or a frame of an elbow of the slave robot arm.

The system supports an operator in intuitive commanding of the slave robot arm via the master robot arm; the operator can then sense and see how the master robot arm reacts using the combination of haptic and visual feedback from the application at hand. As part of the robot tasks, the motion instructions can be defined in an immersive manner, and thereby facilitating the operator to stay focused on the actual task. Immersive here means that the desired end-effector operation (for instance with a for the task suitable force acting on the workpiece) results from a natural/physical operator interaction, with the operator totally focused on the intended motion while spending a minimum cognitive effort on any surrounding artificial/dynamic constraints such as dynamic effects of proximity to singular configurations that are not physically obvious. One goal is thus to maintain the kinematic coupling despite such dynamic effects.

The system gives flexibility in instructing the robot, as the physical arrangement of the robotic (and possibly human) workplace can vary between instructing the robot and the robot performing the task. By physically and virtually maintaining the relationship between the end-effector and the workpiece, with forces determined from the operator-robot interaction, in combination with a mapping that in a flexible way copes with any artificial limitation, changes such as type of robot and arm placement are permitted without the complex tuning as in applications today.

The system makes it possible for the operator to teach the robot in an intuitive way, which is industrially valuable since operators knowing the manufacturing processes (but with very little experience of programming and today's complex tuning of indirectly acting robot instructions) can work closer to the physical process at hand. Still, the operator must cope with practical limitations such as robot workspace boundaries and limited gripper dexterity, but since such limits are apparent to the operator and since the commanding is dealt with by a controller that can be configured to monitor and map the involved physical quantities to whatever internal representation that is needed, the complexity of the control is encapsulated such that instructing the robot is perceived as being intuitive.

As mentioned, force interacting tasks are particularly difficult to program. A major problem with prior technologies is that the operator is not able to feel the same motion and forces as those acting between an interaction point of the robot and a workpiece. The disclosed system solves this problem. Previously the kinematic and dynamic effects of the robot motions disturbed the demonstration, but with the present innovative system such effects are taken care of. Thereby, the system is useful for speeding up the process of programming tasks involving force interaction. Since both force and position are taken into account, reasonable variations in position of a workpieces can be coped with easily.

The well-defined force interaction in combination with the fact that system restrictions are often related to dynamic limitation such as limited torques and inertial forces, the model-based approach means that the dynamic models impose constraints on the permitted motions, which in an example d industrial implementation are to be easily incorporated by some type of solver instead of advanced/inflexible re-programming.

To facilitate efficient definition of robot tasks, the system provides a solution in which a master robot arm conveys instructions to a slave robot in an efficient and intuitive manner that fits with existing industrial robot control systems. The master robot arm is e.g. a physical robot arm, which can be a standard haptic interface or a manipulator with force sensing and force control capabilities. The slave robot arm can be the real robot to be used in the application or its virtual representation with an adequate model of the environment. Multiple master arms and multiple slave arms are obvious extensions. For example, one dual-arm robot may act as a master device for an operator using both hands for separate motions, influencing another dual arm robot that performs instructions as a slave dual-handed device. Modern industrial controllers permit such connections over a real-time communication network. For brevity, a single master and a single slave is described in the sequel.

Although the master and slave roles of arms may change dynamically during operation, and the desired coupling between master and slave is beyond functionality of existing robot products, robots available on the market can still be used as modules by means of the included mapping between the intended operation in virtual terms and the physical command/control signals to existing interfaces. Thus, desired forces for haptic feedback can be defined in accordance with industrial practices and performance needs.

According to some embodiments, the constraint submodule comprises a plurality of motion constraints, and wherein the calculation submodule is configured to calculate the joint movement command for the master robot arm and the joint movement command for the slave robot arm based on the plurality of motion constraints such that a corresponding constrained motion is accomplished, while constraints imposed by the dynamic models are respected. In other words, the calculation submodule is configured to calculate the joint movement command for the master robot arm and the joint movement command for the slave robot arm such that additional motion constraints are respected. An additional motion constraint, thus one of the plurality of motion constraints, may include a joint limit, a distance between a pair of frames, coupling of a pair of joints or a motion constraint for a task including motion along a surface with a certain force. In one implementation the configuration of the calculation submodule is done automatically based on declarative symbolic dynamic models and declarative symbolic constraints that are included in the constraint module, thereby avoiding the need for re-programming the system for new applications/equipment. Thus, the proposed incorporation of a plurality of constraints is a feature of the present invention according to one embodiment. It should here be mentioned that mentioned kinematic coupling defined by the constraint submodule is also a motion constraint. The motion constraints are defined by the user according to the application setup and represented in the constraint submodule.

According to some embodiments, the calculation submodule is configured to determine a solution to a system of differential-algebraic equations defining a relation between dynamics of the system and the forces and/or torques needed to accomplish the kinematic coupling while the constraints imposed by the dynamic models are respected, and to use the solution to calculate the joint movement command for the master robot arm and the joint movement command for the slave robot arm. The system of differential-algebraic equations will be explained in greater detail in the following.

According to some embodiments, the calculation submodule is configured to calculate the solution to comprise the forces and/or torques needed to accomplish the kinematic coupling while the constraints imposed by the dynamic models are respected. These forces and/or torques may be referred to as virtual/artificial/dynamic forces and/or torques. This is because they are not real forces and/or torques acting against the system, but forces and/or torques calculated by the system to reflect the kinematic and dynamic constraints of the system, and which are then applied by the system such that the operator can perceive the constraints of the system etc. via haptic feedback. In other words, the calculation submodule, e.g. the solver submodule, is configured to determine at least one virtual force and/or at least one virtual torque needed to maintain motion constraints on the master robot arm and/or on the slave robot arm, and wherein the calculation submodule further is configured to determine the joint movement command for the master robot arm, and the joint movement command for the slave robot arm also based on the at least one virtual force. Thus, the conceptual virtual force is here being explicitly represented.

According to some embodiments, the calculation submodule, such as the solver submodule, is configured to determine the at least one virtual force and/or at least one virtual torque needed to maintain motion constraints in any kinematic configuration. Thus, the calculation submodule is here configured to calculate the virtual force and/or virtual torque in order to enforce dynamic constraints, for any kinematic configuration of the slave robot arm and/or master robot arm.

According to some embodiment, the master robot arm and the slave robot arm have dissimilar kinematics and/or have dissimilar degrees of freedom, DOF. Thus, there is no need to have the same kinematics or the same number of DOFs of the master robot arm and the slave robot arm in the proposed system. According to some embodiment, the control unit is configured to calculate a joint movement command for another master robot arm and/or a joint movement command for another slave robot arm without re-programing the control unit. With re-programming here means change of system software or robot programs to cope with unforeseen combinations of master and slave arm properties. Such a change, as necessary with any prior-art solution, would be problematic since it would require competencies that are normally not available at user sites. Instead, according to the present invention, application constraints are expressed in a declarative manner in a constraint module, which via a solver results in the necessary computations.

According to some embodiments, the system is configured to record the determined joint movement command and the slave external force data. According to some embodiments, the system is configured to determine a robot program or robot instructions based on the recorded resulting movement expressed in the frame related to the slave robot arm, and based on the recorded resulting/applied force to the workpiece in the same frame. According to some embodiments, the robot program comprises at least one set of instructions.

According to some embodiments, the kinematic coupling between the master coupling frame and the slave coupling frame is defined in task space. Task space (also known as operational space) refers to the space where motion and forces of a Cartesian frame relevant to the robot task is specified. This frame can for example be attached to the end effector, an object held by the end effector, or a fixed or moving object that the robot works on.

According to some embodiments, the dynamic models are non-linear dynamic models, for instance in terms of mechanical multi-body effects and in terms of non-linear feedback for proper dynamic behaviour. It should here be mentioned that a linear model, as found e.g. in prior art, is a special case of non-linear models. The present invention thus deals with a more generic case of real-world dynamics as resulting from the physical properties of a system, which differs from the dynamics obtained using standard closed loop control that by actuation is permitted to more freely modify the dynamics.

According to some embodiments, the master external force data is determined based on joint motion data and/or joint position data and/or motor signal data of at least one joint of the master robot arm, and wherein the slave external force data is determined based on joint motion data and/or joint position data and/or motor signal data of at least one joint of the slave robot arm. According to some embodiments, the external force data is obtained from one or several torque sensors and/or joint force data and/or motor signal data of at least one joint of the master robot arm or of the slave robot arm, respectively.

According to some embodiments, the control unit is configured to accomplish a bidirectional transfer of force and torque between the master robot arm and the slave robot arm such that haptic feedback is complied with according to any restricted and singular configuration of the slave robot arm and/or master robot arm. Bidirectional here means a practically simultaneous transfer of control signals such that the force interplay agrees with the models that may be non-causal (DAEs expressed in a declarative manner).

According to some embodiments, the master robot arm is mechanically separated from the slave robot arm. Thus, the slave robot arm and the master robot arm may be separate arms, for example belong to different robots or belong to the same robot that has two physical arms.

According to some embodiments, the slave robot arm is a virtual slave robot arm. The slave robot arm is then virtual as part of a virtual environment. According to some other embodiments, the slave robot arm and the master robot arm are the same arm but arranged with additional force sensing means in order to determine both master and slave forces, i.e. master external force data and slave external force data. The operated slave robot arm is then physical, but the same arm as the master robot arm.

According to some embodiments, the haptic interface module is configured to map at least one restriction on the slave robot arm into at least one intuitive force reaction that the control unit is configured to reproduce as haptic feedback to the master robot arm.

According to some embodiments, the intuitive force reactions correspond to a direct kinematic coupling over a common workpiece that is common to the master robot arm and the slave robot arm.

According to a second aspect, the disclosure propose a method for instructing a robot. The method comprising: determining master external force data indicating a force interplay between an operator and a master robot arm and determining slave external force data indicating a force interplay between a slave robot arm and a workpiece. The method further comprises calculating a joint movement command for the master robot arm and a joint movement command for the slave robot arm, based on the master external force data, the slave external force data, a model, i.e. a dynamic model, of the master robot arm, a model, i.e. a dynamic model, of the slave robot arm, and a defined coupling, i.e. a kinematic coupling, between a designated master coupling frame of the master robot arm and a designated slave coupling frame of the slave robot arm, and by enforcing a relationship between the dynamic models including forces/torques for accomplishing the kinematic coupling, while respecting constraints imposed by the dynamic models resulting in that a velocity of the master coupling frame and a velocity of the slave coupling frame are interrelated. The method further comprises controlling the master robot arm and the slave robot arm according to the joint movement commands. The operator then receives haptic feedback from the force interplays reflecting dynamics of the master robot arm and the slave robot arm. The dynamics of the master robot arm and the slave robot arm results from their physical properties and their individual (or common) control systems/control units. The haptic feedback from the force interplays may reflect further dynamics of the system, as explained in connection with the system and as will be further explained in the following.

The same positive effects as with the system may be accomplished with the method, and reference is made to the corresponding sections above.

According to some embodiment, the calculating comprises calculating the joint movement command for the master robot arm and the joint movement command for the slave robot arm based on the plurality of motion constraints such that a corresponding constrained motion is accomplished, while constraints imposed by the dynamic models are respected. With other words, according to some embodiments, the calculating comprises calculating the joint movement command for the master robot arm and the joint movement command for the slave robot arm such that additional motion constraints are respected. An additional motion constraint, thus one of the plurality of motion constraints, includes e.g. a joint limit, a distance between a pair of frames, a coupling of a pair of joints or a motion constraint for a task e.g. moving along a surface with a certain force. It should here be mentioned that mentioned kinematic coupling is also a motion constraint. The motion constraints may be predefined by the user.

According to some embodiments, the calculating comprises determining a solution to a system of differential-algebraic equations defining a relation between dynamics of the system and the forces and/or torques needed to accomplish the kinematic coupling while the constraints imposed by the dynamic models are respected, and using the solution to calculate the joint movement command for the master robot arm and the joint movement command for the slave robot arm. The system of differential-algebraic equations will be explained in greater detail in the following.

According to some embodiments, the calculating comprises calculating the solution comprising the forces and/or torques needed to accomplish the kinematic coupling while the constraints imposed by the dynamic models are respected. The forces and/or torques may be referred to as virtual forces and/or torques. This because they are not real forces and/or torques acting against the master robot arm and/or slave robot arm, but forces and/or torques calculated by the method to reflect the constraints of the dynamic models, the master robot arm/slave robot arm etc., and which are then applied by the method such that the operator can perceive the constraints via haptic feedback. In other words, in some embodiments, the calculating comprises determining at least one virtual force needed to maintain motion constraints on the master robot arm and/or on the slave robot arm, and determining the joint movement command for the master robot arm, and the joint movement command for the slave robot arm also based on the at least one virtual force. Thus, the conceptual virtual force can be explicitly calculated.

According to some embodiments, the calculating comprises determining the at least on virtual force and/or at least on virtual torque needed to maintain motion constraints in any kinematic configuration of the master robot arm and/or the slave robot arm. Thus, any kinematic configuration of the master robot arm and/or the slave robot arm is respected and thus allowed.

According to some embodiments, the method comprises recording the determined joint movement command and the slave external force data. According to some embodiments, the method comprises determining a robot program or robot instruction based on the recorded joint movement command and the slave external force data. According to some embodiments, the method comprises determining a robot program or robot instruction based on the recorded resulting movement expressed in the frame related to the slave robot arm, and based on the recorded resulting/applied force to the workpiece in the same frame. Thus, the joint movement command or commands and the external forces of the slave arm, the resulting movement of the frame related to the slave robot arm, the recorded resulting/applied force to the workpiece can be monitored, determined and/or recorded to form instructions, e.g. motion instructions. According to some embodiments, the robot program comprises at least one set of instructions. Thus, it is possible to form a robot program from at least one set of instructions.

According to some embodiments, the method comprising determining the master external force data based on joint motion data and/or joint position data and/or motor signal data of at least one joint of the master robot arm, and determining the slave external force data based on joint motion data and/or joint position data and/or motor signal data of at least one joint of the slave robot arm. According to some embodiments, the method comprising obtaining the external force data from one or several torque sensors and/or joint force data and/or motor signal data of at least one joint of the master robot arm or of the slave robot arm. Thus, explicit force sensing, or observations from motor torques, can be used to determine external forces.

According to some embodiments, the calculating comprising accomplishing a bidirectional transfer of force and torque between the master robot arm and the slave robot arm such that haptic feedback is complied with, or adjusted, according to any restricted and/or singular configuration of the slave robot arm and/or master robot arm.

According to some embodiments, the master robot arm is mechanically separated from the slave robot arm.

According to some embodiments, the slave robot arm is a virtual slave robot arm.

According to some embodiments, the calculating comprises mapping at least one restriction to the slave robot arm into at least one intuitive force reaction and reproducing the intuitive force reaction as haptic feedback to the master robot arm. According to some embodiments, the intuitive force reaction corresponds to a direct kinematic coupling over a common workpiece that is common to the master robot arm and the slave robot arm.

According to a third aspect, the disclosure relates to a computer program comprising instructions which, when the program is executed by a control unit or a computer connected to the computer, cause the control unit to carry out the method according to any of the method steps as disclosed herein.

According to a fourth aspect, the disclosure relates to a computer-readable medium comprising instructions which, when executed by a control unit or a computer connected to the control unit, cause the control unit to carry out the method according to any of the embodiments as described herein.

DETAILED DESCRIPTION

Figure 1:
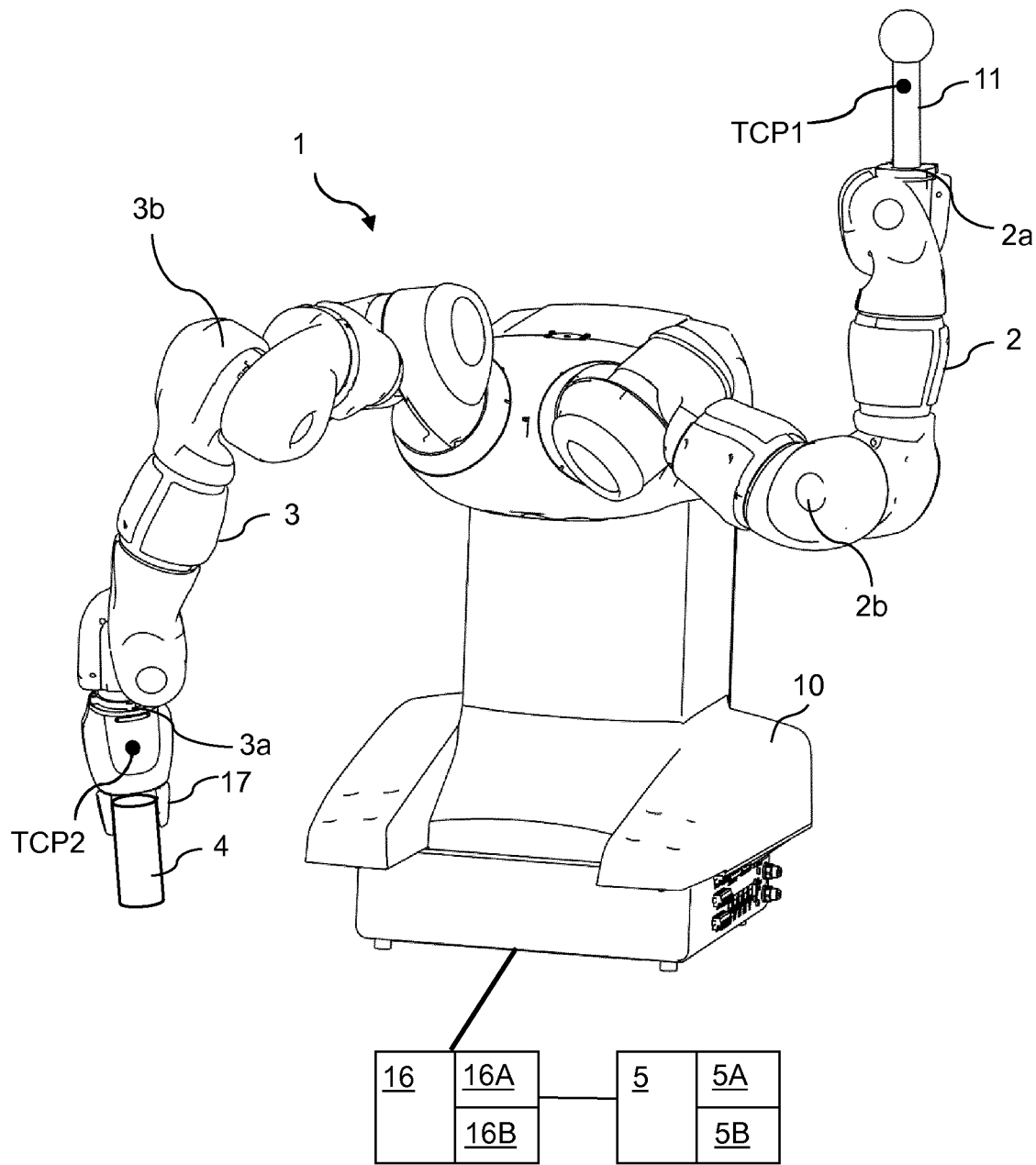
FIG. 1 illustrates a two-armed collaboration robot according to some embodiments.

Definitions Master robot arm: A robot arm, or any kinematic device or linkage, that continually or temporarily is arranged for being influenced by physical operator interaction via at least one interaction point such as an end effector or tool centre point, TCP. The influence via any such interaction point can be any combination of forces and torques in one to six dimensions. Simultaneous use of multiple interaction points permits more than six dimensions, e.g., for influencing both an end-effector and a kinematic configuration of a redundant (slave) robot arm.

Slave robot arm: A robot arm, or any kinematic device or linkage, that continually or temporarily is arranged for (virtual or physical) motions that are intended for an effect on the (virtual or physical) environment via at least one interaction point such as an end-effector or TCP.

Constraint module: A control system module that defines and stores motion constrains, such as the coupling between a pair of coupling frames. A motion constraint may be defined e.g. in terms of relative position and/or orientation, distance coupling of a pair of frames, coupling of a pair of joints as well as other motion constraints such as joint limits and task constraints. The coupling between a pair of coupling frames may include a mapping between a master robot arm and a slave robot arm. The constraint module may include a plurality of couplings between pairs of coupling frames. A preferred constraint module implementation is generic with respect to the robot configuration (kinematics, end-effectors, location, etc.) and to the task at hand.

Constraint: The system is under influence of different types of constraints. Constraints that results from the physical properties of the system such as the construction of the mechanical system, or the environment, may be referred to as actual, intrinsic or natural constraints. Constraints that result from the control system/control unit may be referred to as calculated constraints (or enforced constraints). The calculated constraints give rise to calculated forces/torques. The constraints of the system may be divided in motion constraints and dynamic constraints. Motion constrains include the kinematic coupling and geometrical constraints. The dynamic constrains arise from the dynamics of the system. Virtual force (VF) or Virtual Torque (VT): Calculated force respective calculated torque to maintain a coupling between the master robot arm and the slave robot arm and respect other motion constraints (joint limits, etc.). Motion constraints, e.g. kinematic constraints, are imposed by virtual constraints, which result in virtual forces and/or virtual torques. Thus, as a response to a constraint, either a constraint that is defined in beforehand or a constraint that is inherent in the system, one or several forces/torques is calculated for each arm and applied in the system. The system may be under influence of several different constraints at the same time, and the calculated force/torque is then a response to all the several different constraints.

Solver: A Differential-Algebraic Equation (DAE) solver, which uses the constraints in the constraint module, a model of the master robot arm and a model of the slave robot arm, to compute the virtual force/virtual torque over time. A task can be accomplished by means of a declarative symbolic description of a state-transition system in combination with a DAE system, where the latter requires the solver for determining the actual control outputs such as motion commands or servo setpoints. By also expressing the constraints in a declarative way, typically according to some symbolic math software package, new robot tasks and new equipment/robots can be incorporated without re-programming.

Immersive: When an operator is enabled, e.g. by a system, to stay totally focused on a task including force interplay with a workpiece, such that the operator can intuitively perform the task, where the system supports the operator to stay totally focused on the task by transferring movements and forces from the operator to the robot and vice versa while respecting constraints. The operator then does not have to spend cognitive effort on respecting any constraints induced by the system itself, as these are transferred to the operator in an intuitive way. The system supports the operator by reflecting the intrinsic or desired constraints to the operator as haptic feedback while transferring movements and forces from the operator to the robot and vice versa. The operator thus experiences the real world through the robot.

Immersive interface: An operator interface, here for kinaesthetic teaching that engages the operator in an immersive manner.

Haptic feedback: Propagation of forces by physical contact with the operator such that a sense of touch is perceived.

Immersive feedback: Haptic feedback to the operator via a control system or control unit such that an immersive interface is accomplished together with direct visual feedback. Force interplay: Bidirectional force interaction between master robot arm and operator, and between slave robot arm and workpiece.

Interaction point on master robot arm: A point, or more generally a handle, on the master arm designated to provide force interaction with the operator, normally in six dimensions for both force and torque. However, jointed handles or special devices may limit the influence to fewer dimensions. Multiple points (for example one per finger) may be present, but in the following one equivalent point is assumed (for example representing an equivalent handle with the same effect as multiple finger forces).

Interaction point on slave robot arm: A point, or multiple of points, on the slave robot arm, for example an effector attached to the end point of the slave robot arm as an end effector or an effector mounted to an elbow of the slave robot arm.

Coupling frame: A coordinate frame firmly attached to a point on the master robot arm, and a corresponding frame on the slave robot arm, where the master and slave coordinate frames are coupled by means of the control as per the present invention. There is at least one coupling frame for each of the master and slave arms. A pair of coupling frames comprises a coupling frame of a master robot arm and a corresponding coupling frame of a slave robot arm. Thus, a pair of coupling frames includes a master coupling frame and a slave coupling frame.

The disclosure concerns an immersive haptic interface for task demonstration, where the operator can sense and act through the robot. This is achieved by coupling two robotic arms or systems on a dynamical level. Limitations caused by singular configurations or the reach of either of the arms or robots may be naturally reflected to the other as haptic feedback.

First an introduction to the topic will be described. Thereafter follows a description of an exemplary robot, and other examples, where the immersive haptic interface can be used, and description of the immersive haptic interface itself. Then, methods for instructing a robot using the immersive haptic interface will be described.

A robot can be taught to handle a multitude of tasks. Many tasks are however still carried out manually, since it is overly difficult to program the robot to achieve a similar performance. Typically, these tasks involve interaction with an object or the environment, where the success of the task largely relies on the skills of the human. To program a robot, these skills need to be transferred to the robot. The most natural way for a human to do this is via demonstration. For teaching by demonstration, if the robot does not have a similar kinematic structure to the operator doing the demonstration, the mapping between robot motion and human motion will not be trivial. By using the robot as part of the demonstration of a task, this problem could be entirely avoided. Therefore, this approach has been widely used in human skill acquisitions. Despite this, the interface between humans and robots can be inconvenient and difficult for accurately transferring motions because of mechanical properties of robots such as inertia and friction. Although compliant motion control could be employed to reduce inertial/friction forces, direct teaching of industrial robots is still limited. Moreover, the mechanical coupling between the operator, the robot, and the workpiece makes it impossible to record faithfully the required force values for a task. Hence, an interface for demonstrating a task can contribute by allowing the operator to perceive the differences and limitations of the robotic system.

A physical robot, if equipped with force control capabilities, can be used as a haptic device. However, for proper definition of force-interacting motions to be performed with the end-effector that is available to the robot, the force control should act via the robot for motion commands to later be useful in the actual physical environment. In the case of accurate modelling of the equipment, including the robot and its end-effector, and environment including workpiece and peripherals, the robot performing the task does it virtually and only one physical robot acting as a haptic device is needed.

Previously existing implementations of haptic interaction are not industrially applicable. A main reason is that in any realistic setup there are motion constraints that also need to be managed. Neither full awareness nor classification of these constraints and their impact on the application has previously existed, nor proper handling of them such that an immersive operator experience can be created. The transparency is further limited by the structures of the master or the slave devices. Allowing the arms to have different configurations, increases substantially the flexibility in demonstration. For example, the demonstration of a task can be performed in a part of the workspace that is more convenient for the operator. However, when two robotic systems are employed in a master-slave configuration, their workspace is limited to the points reachable by both systems simultaneously. This defines a common workspace for the robots. At the boundary of that common workspace, one or both of the systems are typically in a singular configuration with reduced manipulability.

As has been previously mentioned, previously existing technologies are not considered to define interaction forces efficiently in a robot programming context. A way forward is enabled by recent industrial developments of dual-arm robots, as one arm is readily available to act as a haptic interface. Motivations for such robots comprise safe levels of maximum power per arm in combination with short cycle times, improved flexibility by avoiding fixtures, compatibility with human workplaces, and manipulability in general.

Furthermore, most modern robot controllers have so called multi-move functionality, which means that two or more robots can be connected over a real-time communication link and programmed together as a dual arm or multi-arm robot with a plurality of arms.

In the following an inventive system 1 and a method for instructing a robot will be described, with reference to the figures. The robot is generally a common robot that is not specifically designed as a haptic device. The disclosure thus proposes a generic approach to provide an immersive user experience. Utilizing both visual and haptic feedback from a robot or a model of it, an operator can ideally feel and perceive a task from the robot's perspective, hence enabling accurate demonstration including force specification.

Initially, each arm can move freely using lead-through setup. Upon activation of the system, the arms move in synchrony respecting the initial fixed offset between the end-effectors. This constitutes an immersive haptic interface, where the operator can impact the environment while receiving the haptic feedback.

As previously explained, a robot is here defined as a programmable manipulator with one or several arms, each arm optionally being equipped with one or several end-effectors and the joints of the one or several arms being controlled by a controller. FIG. 1 illustrates a robot 10 that may be included in the system 1. The depicted robot 10 is a two-armed, or dual-arm, collaborative robot that is arranged to work on a workpiece 4 according to a program with computer instructions. The robot 10 comprises a first arm 2 and a second arm 3. The first arm 2 comprises a plurality of links and joints, and the second arm 3 comprises a plurality of links and joints. A link and a joint are commonly referred to as an axis. Each axis is driven by an actuator, i.e. a servo-controlled motor, via a transmission. The first arm 2 is arranged with an end effector 11 in the shape of a teaching handle. The second arm 3 is arranged with an end effector 17 in the shape of a gripper. The gripper here holds the workpiece 4. Each arm 2, 3 has got seven axes. Some axes that may be important for the application at hand are explicitly referred to in the figure. The end effector 11 is attached to the seventh axis 2a of the first arm 2. The seventh axis 2a comprises a first end flange defining a first end flange frame, the end effector 11 is attached to the first end flange. The end effector 11 defines a first tool centre point, TCP1, being the centre point of the end effector 11. The end effector 11 further defines a first TCP frame, which originates in the TCP1. The forth axis 2b, also referred to as the elbow, of the first arm 2, defines an elbow frame of the first arm 2. The elbow frame of the first arm 1 is thus defined in relation to the elbow of the first arm 2. Turning to the second arm 3, the end effector 17 is attached to the seventh axis 3a of the second arm 3. The seventh axis 3a comprises a second end flange defining a second end flange frame, the end effector 4 is attached to the second end flange. The end effector 4 defines a second tool centre point, TCP2, being the centre point of the end effector 4. The end effector 4 defines a second TCP frame, which originates in the TCP2. The forth axis 3b, also referred to as the elbow, of the second arm 3, defines an elbow frame of the second arm 3. The elbow frame of the second arm 3 is thus defined in relation to the elbow of the second arm 3.

The robot 10 is arranged to be controlled by a controller 16. The controller 16 comprises processing means e.g. one or several processors 16A, and memory means e.g. one or several memory units 16B. A program with computer instructions may be loaded into the memory unit 16B and when executed by the processor 16A, the robot 10 acts according to the computer instructions. The controller 16 is thus programmed to make the system 1 act according to the computer instructions. In order to produce a program with a trajectory for the robot 10, the robot 10 may be instructed by an operator as will be explained in the following.

At least one of the arms of the system 1 is a physical arm, referred to as a master robot arm arranged for being influenced by operator interaction. The first arm 2 in FIG. 1 may thus be referred to as the master robot arm. The operator may thus interact with the master robot arm, e.g. via the end effector 11, here the teaching handle, attached to the tool flange of the master robot arm. The system 1 further comprises a second arm 3, referred to as a slave robot arm that is arranged for interaction with a workpiece 4. The second arm 3 in FIG. 1 may thus be referred to as the slave robot arm. The slave robot arm may be either a virtual slave robot arm or a physical slave robot arm. If the slave robot arm is a virtual slave robot arm, the slave robot arm is then virtual as part of a virtual environment. According to some embodiments, the master robot arm is mechanically separated from the slave robot arm. Both the master robot arm and the slave robot arm are then physical robot arms. According to some other embodiments, the slave robot arm and the master robot arm are the same arm but arranged with additional force sensing means in order to determine both master and slave forces, i.e. master external force data and slave external force data. The operated slave robot arm is then physical, but the same arm as the master robot arm. In some embodiments the master robot arm may be seen as a joystick for controlling the slave robot arm. The system 1 further comprises a control unit 5 comprising processing means such as one or several processors 5A, and memory means such as one or several memory units 5B. The control unit 5 may be included in the controller 16, or may be separated from the controller 16. The control unit 5 may e.g. be a separate computer. The control unit 5 may implement a haptic interface as a haptic interface module as will be explained in the following. Typically, the modules and submodules that will be explained in the following may be program modules that are implemented as software and loaded into the memory of the memory unit 5B.

The control unit 5 is further configured to determine master external force data indicating a force interplay 2A (FIG. 2) between the operator 6 and the master robot arm. The force interplay here indicates a bidirectional force interaction between the master robot arm and the operator. The master external force data is for example determined based on joint motion data and/or joint position data and/or motor signal data of at least one joint of the master robot arm. Alternatively, the master external force data is obtained from one or several force/torque sensors 20 (FIG. 2) (attached to the wrist and/or to one or several joints of the master robot arm) and/or joint force data and/or motor signal data from the master robot arm. The control unit 5 is further configured to determine slave external force data indicating a force interplay 3A (FIG. 2) between the slave robot arm and the workpiece 4. The force interplay here indicates a bidirectional force interaction between the slave robot arm and the workpiece. The slave external force data is for example determined based on joint motion data and/or joint position data and/or motor signal data of at least one joint of the slave robot arm. Alternatively, the slave external force data is obtained from one or several force/torque sensors 30 (FIG. 2) (attached to the wrist and/or to one or several joints of the master robot arm) and/or joint force data and/or motor signal data from the slave robot arm. Optimally the master external force data and the slave external data is indicating estimated or measured torques of all the joints of the arms 2, 3, and optionally from wrenches (force and torque) at the end-effectors of both arms 2, 3, retrieved from sensor measurements or estimated as explained in "Estimating robot end-effector force from noisy actuator torque measurements", M. Van Damme et al, from Proc. IEEE Int. Conf. Robotics and Automation (ICRA), 9-11 May, Shanghai. China, pages 1108-1113, year 2011. For example, the master robot external force data and the slave robot external force data are retrieved from the torque/force and position read-outs of one or several actuators driving a joint, respectively, or from force/torque sensors mounted to the arms 2, 3. The force/torque sensors may be wrist-mounted force sensors. As known to the skilled person, the torque of an actuator may be read out from the current consumed by the actuator, and then used to determine other torques and forces.

Figure 2:
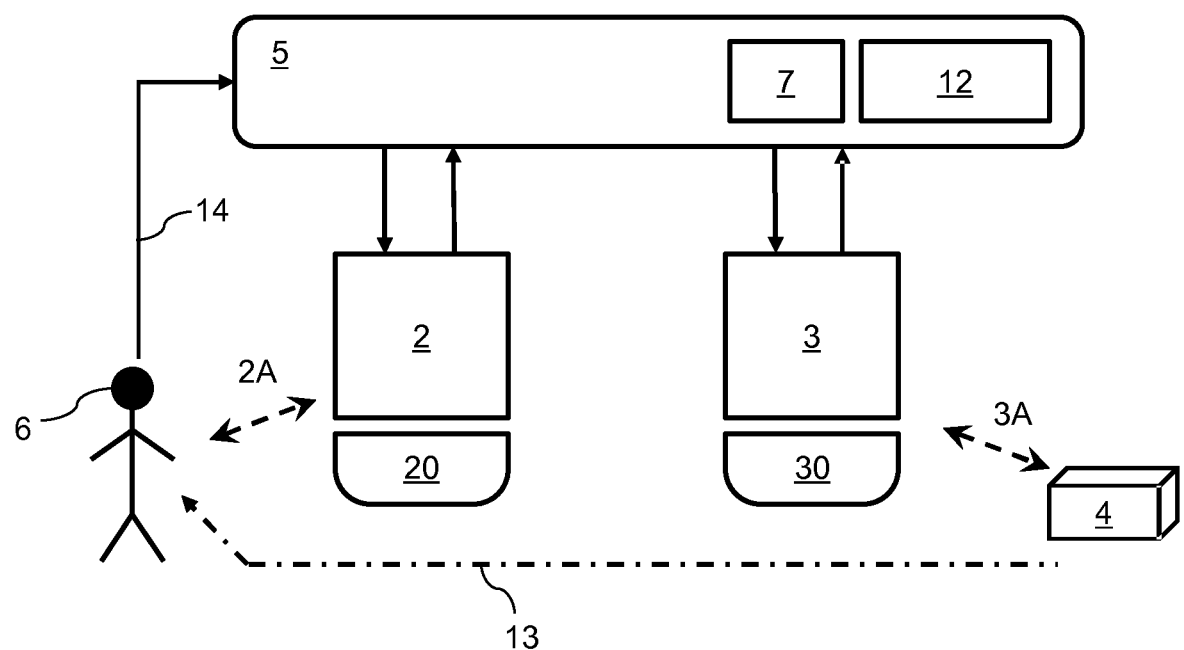
FIG. 2 illustrates a control architecture according to some embodiments.

The haptic interface is generally described with reference to FIG. 2. The haptic interface is implemented as software in the control unit 5. As illustrated in the figure, the master robot arm 2 is arranged to be in communication with the control unit 5 for receiving movement commands to the master robot arm 2 (e.g. via the controller 16) and for feedback of the position and/or torque of master robot arm 2. Further, the slave robot arm 3 is arranged to be in communication with the control unit 5 for communication of movement commands to the slave robot arm 5 (e.g. via the controller 16) and for feedback of the position and/or torque of slave robot arm 3. The control unit 5 further comprises a haptic interface module 7 for implementing the haptic interface. When the operator 6 applies force on an arbitrary point, here referred to as an interaction point, of the master robot arm 2, the control unit 5 is configured to generate movements in both arms 2, 3 invoked by the applied force. The control unit 5 receives master external force data and slave external force data as indicated above. The slave robot arm 3 is arranged to work on the object 4, and the restrictions the slave robot arm 3 encounters are transferred, by the haptic interface, as haptic feedback to the operator 6 via the master robot arm 2. The haptic interface module 7 is thus configured to calculate physically consistent motions in both arms 2, 3. The operator 6 gets visual feedback 13 of the interplay between the slave robot arm 3 and the object 4. The operator 6 is thus interacting with the slave robot arm 3 via force interplay between the operator 6 and the master robot arm 2, and can visually see the result, e.g. that the slave robot arm 3 is interacting with the object 4. The interaction between the slave robot arm 3 and the object 4 results in a force interplay 3A between them that is reflected in the slave external force data. The control unit 5 may also comprise a program module 12 that interacts with the haptic interface module 7. The program module 12 comprises programs for setting the control unit 5 in different modes, or to enable a certain function of the control unit 5. For example, the control unit 5 and thus the haptic interface module 7 may be configured to be set in different modes of operation such as "activated instructing mode", "deactivated instructing mode", "recording mode", "setting up interaction frames mode" etc. The system 1 may be provided with a user interface connected to the control unit 5 and arranged to change mode of the control unit 5 and thus the haptic interface module 7 based on operator commands 14 from the operator 6 to the user interface. For example, the program module 12 may comprise a program to activate and deactivate an instruction mode of the robot 10 that allows moving any or both of the master robot arm and the slave robot arm simultaneously. It may also comprise a program that in the "recording mode" records the resulting trajectories and forces. In the "setting up coupling frames mode" the operator 6 can specify one or several coupling frames of the master robot arm, and one or several coupling frames of the slave robot arm to the haptic interface module 7 via the user interface. The coupling frames are set up, thus specified, as pairs.

Figure 3:
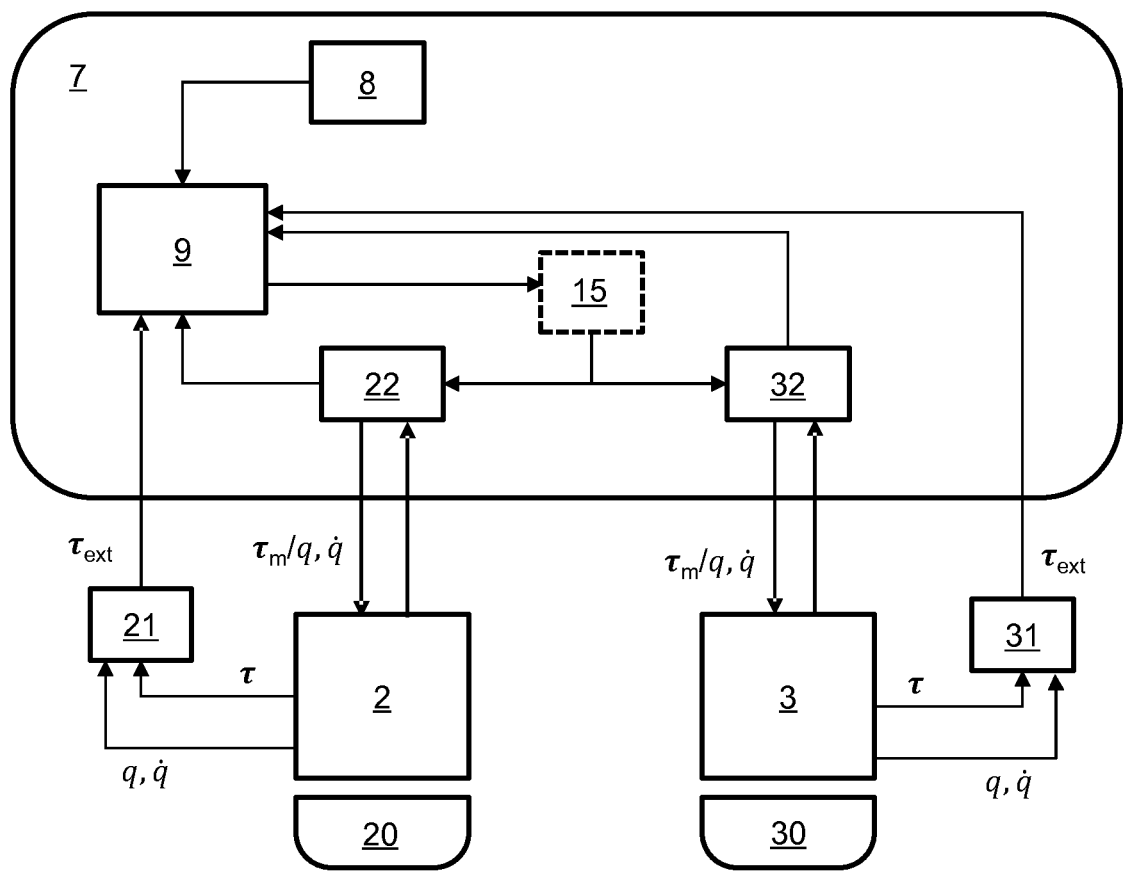
FIG. 3 illustrates some of the control architecture of FIG. 2 in more detail.

In FIG. 3 the haptic interface module 7 is illustrated in more detail. The haptic interface module 7 comprises a constraint submodule 8 defining a kinematic coupling between a designated master coupling frame of the master robot arm 2 and a designated slave coupling frame of the slave robot arm 3 such that a velocity of the master coupling frame and a velocity of the slave coupling frame are interrelated. In other words, the constraint submodule 8 defines a coupling between the described coupling frames. A designated coupling frame of the master robot arm 2 may be any known point on the master robot arm 2. For example, the designated coupling frame may be the tool centre point, defining a tool frame or TCP frame and where the end effector 11, here the teaching handle (FIG. 1), is attached to the master robot arm 2. The designated coupling frame may also be an end flange frame or an elbow frame of the master robot arm 2. Further, a designated coupling frame of the slave robot arm 3 may be any know point on the slave robot arm 3. For example, the designated coupling frame may be the tool centre point, defining a tool frame or TCP frame and where the end effector 17 (FIG. 1) is attached to the slave robot arm 3. The designated coupling frame may also be an end flange frame or an elbow frame of the slave robot arm 3. A designated coupling frame is thus defined by a local frame attached firmly to a designated point of the robot arm in question. The haptic interface module 7 further comprises a calculation submodule 9, e.g. a solver submodule, configured to calculate a joint movement command for the master robot arm and a joint movement command for the slave robot arm based on: the master external force data, the slave external force data, a dynamic model 22 of the master robot arm, a dynamic model 32 of the slave robot arm, and a relation between the dynamic models including forces/torques for accomplishing the kinematic coupling, while constraints imposed by the dynamic models are respected. This in order to accomplish the kinematic coupling between the designated coupling frames as well as the other motion constraints are accomplished. In some embodiments, the calculation submodule 9 uses a solver, e.g. a DAE solver that uses the dynamic models 22, 32 and the kinematic coupling in the constraint module 8 to calculate a virtual/calculated force/torque 15. The dynamic models 22, 23 are here depicted as boxes but it should be understood that the dynamic models 22, 23 are implemented as program modules. Also, the virtual/calculated force/torque 15 is illustrated as a box with dashed lines to explicitly depict the virtual/calculated force/torque, but it should be understood that the virtual/calculated force/torque is one computational step against determining commands. The virtual/calculated force/torque is one or several calculated forces/torques to maintain the defined kinematic coupling between the coupling frames of the master robot arm and the slave robot arm, while respecting other motion constraints such as joint limits, etc. In other words, the calculation submodule may be configured to determine at least one virtual/calculated force/torque needed to maintain motion constraints on the master robot arm and/or on the slave robot arm, and wherein the calculation submodule further is configured to determine the joint movement command for the master robot arm, and the joint movement command for the slave robot arm also based on the at least one virtual force. According to some embodiments, the calculation submodule 9 is configured to determine the at least one virtual/calculated force/torque needed to maintain motion constraints in any kinematic configuration.

The constraint submodule 8 may comprise a plurality of motion constraints. The plurality of motion constraints, or additional motion constraints, is predefined motion constraints that thus are defined in beforehand and saved in constraint submodule. It could include joint limits, constraints for limiting the motions of the robot arm or avoid entering into any limitation of the robot arm, etc. The calculation submodule is then configured to calculate the joint movement command for the master robot arm and the joint movement command for the slave robot arm based on the plurality of motion constraints such that a corresponding constrained motion is accomplished, while constraints imposed by the dynamic models are respected.

A motion constraint is for example any of the described: a joint limit, a distance between a pair of frames, a motion constraint for a task e.g. a surface, etc.

The dynamic model 22 of the master robot arm and the dynamic model 32 of the slave robot arm are dynamical systems representing the master robot arm and the slave robot arm, respectively. They involve kinematics as well as dynamics of the robot arm, or robot arms. The dynamical properties are user-tuned parameters. The master robot arm and the slave robot arm may be configured to be controlled by one controller each, or may be configured to be controlled by a common controller 16. The robot controller or controllers receives commands from the solver as position $q$, velocity $\dot{q}$ and/or $\tau_m$ commands. Here, q represents a position of a joint, and its derivative $\dot{q}$ represents the velocity of the joint. $\tau_m$ represents a force/torque to the joint, i.e. to the motor of the joint. These joint quantities have corresponding actuator/motor quantities that are used by the joint servo controls, but with known transmission properties such as gear ratios we can equivalently describe with reference to the joints rather than the actuators. The controller or controllers then controls the master robot arm and the slave robot arm according to the joint-level commands.

A respective observer 21, 31 may be used to reconstruct the external forces/torques $\tau_{ext}$ at each joint using the current state of the system $q$, $\dot{q}$ and the motor currents or forces/torques $\tau$ derived from the joint, respectively. An observer 21, 31 may e.g. be a disturbance observer. Examples of applicable observers are explained in "Force estimation and control in robot manipulation", A. Alcocer et al, from Proc. 7$^{th}$ IFAC Symposium on Robot Control 2003 (SYROCO'03), September 1-3, Wroclaw, Poland, volume 1, page 55, year 2004; and in "Estimation of environment forces and rigid-body velocities using observers", from Proc. IEEE Int. Conf. Robotics and Automation (ICRA), May 8-13, San Diego, Calif., pages 931-936, year 1994.

In the following, motion constraints of the system 1 will be investigated and defined. As previously mentioned, a motion constraint defined as a kinematic coupling between the arms 2, 3 is present in the system 1. Several more motion constraints may exist that are defined for the specific task at hand or defined for any other known limitation of the system 1. The dynamic models of the arms 2, 3 implies force constraints to the system 1. Further, interaction between the slave robot arm 3 with the workpiece and the environment implies motion constraints to the system 1 induced by the environment. The overall system 1 also induce motion constraints such as singularities, joint limits etc. Motion constraints of the system 1 comprises geometrical constraints between the master robot arm and the slave robot arm that provides basis for the constraint module 8. These motion constraints are defined in beforehand in the constraint submodule 8.

We assume that the system 1 has in total $n=n_1+n_2$ degrees of freedom, where $n_1$ is the DOF of the master robot arm and $n_2$ is the DOF of the slave robot arm. The generalized coordinates for both the master robot arm and the slave robot arm can be denoted by $q \in R^n$ and split it into coordinates related to the master robot arm and the slave robot arm according to $q^T := (q_1^T, q_2^T)$. The geometrical constraints between the designated coupling frame of the master robot arm and the designated coupling frame of the slave robot arm can then be expressed as:

$$p_2 - p_1 = \Delta p, \quad (1)$$

$$R_1^T R_2 = \Delta R \quad (2)$$

where the variables with subscript 1 concerns the master robot arm and the subscript 2 concerns the slave robot arm. The position of the designated coupling frame of the master robot arm and the slave robot arm, respectively, are denoted by $p \in R^3$, and $R \in SO(3)$ denotes the orientation, $\Delta p$ and $\Delta R$ are offsets in the position and the orientation, respectively. Thus, $p_1$ is here a designated position of the coupling frame of the master robot arm, and $p_2$ is here a designated position of the coupling frame of the slave robot arm. Further, $R_1$ is here a designated rotation of the coupling frame of the master robot arm, and $R_2$ is here a designated rotation of the coupling frame of the slave robot arm.

Multiplying equation (2) by $R_1$ from the left results in $R_2 = R_1 \Delta R$. Now, by differentiating both sides with respect to time, we find:

$$S(\omega_2)R_2 = S(\omega_1)R_1 \Delta R + 0 = S(\omega_1)R_2 \quad (3)$$

Hence, $$S(\omega_2 - \omega_1)R_2 = 0. \quad (4)$$

Here $S(\omega)$ is the skew-symmetric matrix corresponding to the vector product by the angular velocity $\omega$. Therefore, fixed relative positions and orientations imply the following kinematic constraints:

$$v_2 - v_1 = 0, \quad (5)$$

$$\omega_2 - \omega_1 = 0, \quad (6)$$

where $v_i = dp_i/dt$. By expressing these equations in the generalized coordinates, we find the differential kinematics relationships:

$$J_{2P}(q_2)\dot{q}_2 - J_{1P}(q_1)\dot{q}_1 = 0 \quad (7)$$

$$J_{2O}(q_2)\dot{q}_2 - J_{1O}(q_1)\dot{q}_1 = 0, \quad (8)$$

Here $J_{iP}(\bullet)$ and $J_{iO}(\bullet)$ are the translational and rotational geometrical Jacobians with respect to the end effectors. By differentiating the geometrical constraints with respect to time, we have found a kinematic constraint such that:

$$G\dot{q} + g_0 = 0, \quad (9)$$

where $G \in R^{6 \times n}$ is:

$$G = \begin{bmatrix} -J_{1P}(q_1) & -J_{2P}(q_2) \\ -J_{1O}(q_1) & -J_{2O}(q_2) \end{bmatrix} = [-J_1, J_2] \quad (10)$$

and $g_o = 0 \in R^{n \times 1}$. Here we have defined $J_1$ and $J_2$ by stacking together the translational and rotational Jacobians.

The kinematic coupling of the frames defined the constraint submodule 8 may thus be defined inter alia by the equations (1) and (2) above. The coupling is thus made between one coupling frame of the master robot arm and one coupling frame of the slave robot arm. With other words, the coupling is a form of motion constraint between the coupling frame of the master robot arm and corresponding coupling frame of the slave robot arm. The coupling may thus be defined by having constant offsets of the frames as defined by equations (1) and (2). The control law may be extended with several pairs of coupling frames as desired. The number of DOF of the arms limits the number of useful pairs.

In many approaches, the problem of the limitations of the workspace is up to some extent avoided by optimizing the placement or configurations of robotic manipulators. The approach presented here relies on coupling between two robotic arms on a dynamical level. This approach results in a mapping between the master robot arm and the slave robot arm while allowing a theoretically perfect position tracking during free motion and perfect tracking of forces in hard contact tasks of the end-effectors, when there is no kinematic singularity. In order to couple the master robot arm and the slave robot arm on a dynamic level, a solver may be used to continually calculate commands for the master robot arm and the slave robot arm. More specifically, the haptic interface module 7 further comprises the calculation submodule 9, e.g. a solver submodule, configured to calculate a joint movement command for the master robot arm and a joint movement command for the slave robot arm based on: the master external force data, the slave external force data, a dynamic model of the master robot arm, a dynamic model of the slave robot arm, and a relation between the dynamic models including forces/torques for accomplishing the kinematic coupling, while constraints imposed by the dynamic models are respected. The kinematic coupling is thus defined by the constraint submodule 8. The calculation module 9 thus outputs joint movement commands for the master robot arm and the slave robot arm. The system 1 with the controller 16 is further configured to control the master robot arm and the slave robot arm according to the joint movement commands. The operator will then receive haptic feedback from the force interplays reflecting dynamics of the system. The dynamics of the system are defined by differential-algebraic equations that defines the relation between forces and motion, see equations (15)-(18). A command may relate to an instruction, but it may also be a time-series of set-points provided as reference to the servo control according to a trajectory generator or any other computations. The system 1 is further configured to record resulting movement of a frame related to the slave robot arm, and to record resulting/applied force to the workpiece in the same frame. This same frame may e.g. be a TCP frame, an end flange frame, or a frame of an elbow of the slave robot arm 3. The force or forces may be estimated at any frame, given the force measurement/estimation at joints are available.

If measurements are only available at the wrists, it obviously introduces limitations for the measurement of interaction forces on other parts of the robot. However, when the manipulator arms are not moving the forces on either master or slave side are equal. In this case, forces measured from the master side could also be used for the slave side.

To explain the control principle of the system 1, we consider the non-linear system:

$$\dot{x}=f(x)+g(x)u(x), \quad (11)$$

$$y=h(x), \quad (12)$$

where x, u, y denote the state vector, control signals and outputs, respectively. We would like to find u(x) that results in y identically equal to zero, and to find the zero dynamics of the system. We define y as the deviation of the relative translation and orientation between the coupling frame of the slave robot arm and the coupling frame of the master robot arm from a desired offset. Without loss of generality, we here choose these frames to be located at the end-effectors of the master robot arm and the slave robot arm. However, the frames may be located at other places as explained in the foregoing. By zeroing the output, i.e, imposing the virtual/calculated constraint, it is made sure that the end-effectors maintain the fixed offset. We use the motion constraint introduced by equations (7) and (8) as the virtual constraint to find the virtual/calculated forces/torques and thus the motions of the system 1.

To derive the dynamics of the system 1, we start from the kinematic energy:

$$T=\Sigma_i \tfrac{1}{2} m_i \dot{q}^T J_P^{(i)T} J_P^{(i)} \dot{q} + \Sigma_i \tfrac{1}{2} \dot{q}^T J_O^{(i)T} R_i I_i R_i^T J_O^{(i)} \dot{q}, \quad (13)$$

where $m_i$ and $I_i$ denote the mass and inertia matrix of link i, respectively, $J_P^{(i)}$ and $J_O^{(i)}$ denote partial Jacobians up to the link i and $R_i$ is the rotation matrix from the world coordinate to the link i. Since we aim to compensate for gravitational force, we do not include the potential energy in the Lagrangian L. Hence, we want:

$$L=T. \quad (14)$$

Assuming only viscous friction with coefficient $\mu_\nu$, the equations of motion for the constrained system according to the Lagrange-d'Alembert theorem can be derived as:

$$M(q)\ddot{q}+C(q,\dot{q})\dot{q}=Q^e+Q^{kc}-\mu_\nu \dot{q} \quad (15)$$

$$G\dot{q}+g_0=0, \quad (16)$$

where M(q) is the mass matrix, $C(q,\dot{q})\dot{q}$ denotes the total effect of centripetal and Coriolis forces. The generalized external forces and the generalized forces due to the kinematic constraints are denoted by $Q^e$ and $Q^{kc}$, respectively and fulfil the relations:

$$Q^e=\tau+J^T h^e, \quad (17)$$

$$Q^{kc}=G^T \lambda, \quad (18)$$

where τ is the vector of external torques applied at the joints, $h^e$ is the vector of forces and torques exerted on the end-effector, and $\lambda_{6\times1}(t, q, \dot{q})$ are Lagrange multipliers. The calculation submodule 9 implements equations (15) and (16), and simulates forward the physical system of the master robot arm and the slave robot arm. Outputs from the simulation provides basis for movement commands to the controllers of the master robot arm and the slave robot arm. The equations (15)-(18) defines a system of differential-algebraic equations that the calculation submodule 9 is configured or programmed to solve. Thus, the calculation submodule 9 is configured to determine a solution to the system of differential-algebraic equations defining a relation between dynamics of the system 1 and the forces and/or torques needed to accomplish the kinematic coupling while the constraints imposed by the dynamic models are respected. The calculation submodule 9 is further configured to use the solution to calculate the joint movement command for the master robot arm 2 and the joint movement command for the slave robot arm 3. The dynamic models for the arms 2, 3 thus impose constraints to the system 1, which depends on the kinematics and the inertial properties of the arms 2, 3. The calculation submodule 9 may further be configured to calculate the solution to comprise the forces and/or torques needed to accomplish the kinematic coupling while the constraints imposed by the dynamic models are respected.

By introducing subscripts 1 and 2 for the parameters and variables, we find $$M(q) := blkdiag(B_1(q_1), B_2(q_2)), \quad (19)$$

$$J(q) := blkdiag(J_1(q_1), C_2(q_2)), \quad (20)$$

$$C(q, \dot{q}) := blkdiag(C_1(q_1, \dot{q}_1), C_2(q_2, \dot{q}_2)), \quad (21)$$

$$h^e := \begin{bmatrix} h_1^e \\ h_2^e \end{bmatrix}, Q^{kc} := \begin{bmatrix} Q_1^{kc} \\ Q_2^{kc} \end{bmatrix}, \quad (22)$$

where blkdiag(•) denotes the block diagonal concatenation operator and the equations of motion for each individual arm is $$B_i(q_i)\ddot{q}_i + C_i(q_i,\dot{q}_i)\dot{q}_i = \tau_i + J_i^T(q_i)h_i^e + Q_i^{kc} - \mu_v \dot{q}_i. \quad (23)$$

Therefore, the control law for each arm to maintain the constraint is equal to the constraint force and derived as $$Q_1^{kc} = -J_1^T(q_1)\lambda, \quad (24)$$

$$Q_2^{kc} = J_2^T(q_2)\lambda. \quad (25)$$

By introducing $x^T = (q^T, \dot{q}^T)$ and substituting $\lambda$ with u, we can write (15) and (16) as $$\dot{x} = \begin{bmatrix} \dot{q} \\ M^{-1}(q)(-C(q,\dot{q})\dot{q} - \mu_v\dot{q} + Q^e + G^T(q)u) \end{bmatrix} =: f(x) + g(x)u, \quad (26)$$

$$\dot{y} = G(q)\dot{q} =: \frac{\partial h}{\partial x}\dot{x}, \quad (27)$$

where $M^{-1} = blkdiag(B_1^{-1}(q_1), B_2^{-1}(q_2))$. Equations (26) an (27) are in the standard form (11) and (12), except that the output equation has been replaced with its derivative, Equations (15)-(18) define a system of index-2 DAEs, which can be solved numerically. From a control-design perspective, the solution is the zero dynamics of system (26) and (27) with relative degree two.

Let us define $\Gamma^{-1} := GM^{-1}G^T$. An optimal control u* can be found according to methods known in the control literature, for instance in "*Non-linear control systems*" by A. Isidori, from Springer-Verlag, 1995, which gives:

$$u^* = \Gamma^{-1}\left(GM^{-1}(C\dot{q} - \tau - J^T h^e + \mu_v \dot{q}) - \sum_{k=1}^{n}\left(\frac{\partial G}{\partial q_k}\dot{q}_k\right)\dot{q}\right). \quad (28)$$

We define $$e^T := [e_p^T, e_0^T],$$

where $e_p = p_2 - (p_1 + \Delta p)$ and $e_0 = \varepsilon$ as the vector part of the unit quaternion $Q = \{\eta, \varepsilon\}$ corresponding to $R_2(R_1\Delta R)^T$. The state variable feedback $$\lambda = u = u^* - \Gamma^{-1}(K_d\dot{y} + K_p e) \quad (29)$$

results in $$\ddot{y} + K_d\dot{y} + K_p e = 0. \quad (30)$$

If we assume block diagonal matrices $K_p = blkdiag(K_{tp}, K_{op})$ and $K_d = blkdiag(K_{td}, K_{od})$, (30) can be written as $$\ddot{e}_p + K_{tp}\dot{e}_p + K_{tp}e_p = 0, \quad (31)$$

$$\dot{\tilde{\omega}} + K_{od}\tilde{\omega} + K_{op}e_o = 0, \quad (32)$$

where $\tilde{\omega} = \omega_2 - \omega_1$.

The stability of the rotational part can be established using the Lyapunov function $$V = \frac{1}{2}\tilde{\omega}^T K_{op}^{-1}\tilde{\omega} + (\eta_2 - \eta_1)^2 + (\varepsilon_2 - \varepsilon_1)^T(\varepsilon_2 - \varepsilon_1), \quad (33)$$

with the time derivative along the system trajectory $$\dot{V} = -\tilde{\omega}^T K_{op}^{-1} K_{od}\tilde{\omega} \le 0. \quad (34)$$

Invoking the theorem by LaSalle (or Krasovskii, as known in non-linear control theory), we conclude that $e_0 = 0$, $\omega = 0$ is globally asymptotically stable. Therefore, for positive definite $K_d$ and $K_p$, the solution of (30) converges exponentially fast to zero. The zero dynamics are given by $$M(q)\ddot{q} + R(C(q,\dot{q})\dot{q} - \tau - J^T h^e + \mu_v \dot{q}) + G^T \Gamma^{-1}\sum_{k=1}^{n}\left(\frac{\partial G}{\partial q_k}\dot{q}^k\right)\dot{q} = 0, \quad (35)$$

where $R = I_{n \times n} - P$, and $P = G^T \Gamma^{-1} G M^{-1}$.

By substituting (29) into (24) and (25), we observe how the nonlinear feedback from both arms contributes to the control law. Assuming an accurate model of the arm and after gravity and static friction compensations of the arms, these control laws are applicable. To achieve a different behaviour for a robot than its mechanical properties, we can solve (35) numerically and set the reference of each joint, for instance obtaining references $q_r$ and $\dot{q}_r$ for position and velocity setpoints respectively, which agrees with industrial practice using cascaded position and velocity servo control.

Note that it is possible to calculate the motion even if $\Gamma$ is ill-conditioned, which is a consequence of G being rank deficient. We take derivative of the constraint conditions (28) to obtain $$G\ddot{q} + \sum_{k=1}^{n}\left(\frac{\partial G}{\partial q^k}\dot{q}^k\right)\dot{q} = 0. \quad (36)$$

Equation (36) is an underdetermined system of equations. It has in general either no solution or infinitely many solutions. By using a pseudo inverse when G loses rank, we can find a solution of the form:

$$\ddot{q} = Ks + \ddot{q}_0, \quad (37)$$

where K is an $n \times (n - rank(G))$ matrix expanding the nullspace of G, i.e., GK=0, s is a vector of n−rank(G) unknowns, and $\ddot{q}_0$ is any regularized least-squares solution to (36). Substituting this expression for $\ddot{q}$ into (26) and (27), and pre-multiplying both sides of the first equation by $K^T$ to eliminate $\lambda$, produces $$K^T MKs = K^T(\tau + J^T h^e - C(q,\dot{q})\dot{q} - \mu_v\dot{q} - M\ddot{q}_0). \quad (38)$$

In (38), $K^T MK$ is full rank. Thus, we can solve for s. Substituting s back into (37) gives the value of $\ddot{q}$. By substituting the constraint forces (24) and (25) into the equation of motion of the corresponding arm (23), it becomes clear that A plays the same role as the external wrenches $h_i^e$. Moreover, we conclude that A can be interpreted as the cut forces as if two arms were attached at the end-effectors. This allows an alternative implementation of virtual constraints based on a Newton-Euler formulation, where dynamics of the resulting closed chain is derived by considering interaction forces between links.

If the arms are standing still, i.e., all the time derivatives are equal to zero, and either of the arms is impacted by an external wrench opposite to the other one ($h^e_2 = -h^e_1$), it is easy to verify that $\lambda = h^e_1$ is a solution to (15). This guarantees a perfect transfer of forces at the end-effector to the other arm in the steady state when there is a hard contact and no singular configuration. When $J_i$ loses rank, the equilibrium can be reached not only by equal and opposite forces but also by:

$$h_2^e \in \{-h_e + n | n \in N(J_2^T)\},$$

$$h_1^e \in \{h_e + n | n \in N(J_1^T)\} \tag{39}$$

where $h_e \in R^6$ is an arbitrary wrench and $N(\cdot)$ denotes the null space.

The unique feature of the proposed system is that it couples the master robot arm and the slave robot arm on a dynamical level ensuring the velocities of the coupling frames are identical. This results in a flexible mapping between two not-necessarily-similar arms, yet allowing a transparent transfer of forces and position of coupling frames. Specifically, it allows to use any 6-DOF arm or redundant arm, mounted on any surface and with any initial position to act as either the master robot arm or the slave robot arm. Either of the arms can pass through singular configurations while the haptic feedback is being adjusted while complying with restricted directions. By using estimated forces at the joint level, any point of the arms can behave as a haptic interface. In our model, there is no distinction in the roles of the arms. Hence, master and slave are just for the sake of naming when referencing to the operator side or the workpiece side, respectively.

With the system 1, the actual constraints of the application such as workspace limits of the slave robot arm are conveyed to the operator in a natural manner, while artificial constraints such as passing through a kinematic singularity of the master robot arm is managed by the system 1. In both cases, the overall system then supports the application focus of the operator 6. The operator 6 is thereby provided with immersive feedback in an intuitive way. In other words, the control unit 5 and thus the haptic interface module 7 is configured to accomplish a bidirectional transfer of force and torque between the master robot arm and the slave robot arm such that haptic feedback is complied with, or adjusted, according to the restricted and/or singular configurations. Further, the control unit 5 and thus the haptic interface module 7 may be configured to accomplish dynamic transparency including consideration of mass-related forces by means of control in terms of virtual/calculated forces/torques of the workpiece 4 such that immersive teaching of a robot motion specification is accomplished.

The assignment of master and slave roles to each of the present arms or interaction ports can change during the definition of the task. For instance, when teaching a dual-arm robot 10 as in FIG. 1, during instruction of an assembly operation for the second arm 3 (then being a slave robot arm), the first arm 2 forms the haptic device that is a master robot arm. In a subsequent operation that due to reachability within the workspace is better performed by the first robot arm 2, the second robot arm 3 would be the master robot arm and the first robot arm 2 the slave robot arm.

As a special but illustrative case assume that the arms are similar and the only difference is the mounting plane and the joint values. Let $q \in \mathbb{R}^{n_2}$ represent the generalized coordinates of an arm and $R_0$ denote the rotation of the mounting plane of arm 2 with respect to arm 1. Therefore, by expressing Jacobians and moments of inertia in the rotated frame, we find $$B_2(q) = \sum_{i=1}^{n_2} (m_i J_{2P}^{(i)T} J_{2P}^{(i)} + J_{2P}^{(i)T} R_i I_i R_i^T J_{20}^{(i)}) \tag{40}$$

$$= \sum_{i=1}^{n_2} (m_i J_{1P}^{(i)T} R_0^T R_0 J_{1P}^{(i)T} + J_{10P}^{(i)t} R_0^T (R_0 R_i I_i R_i^T R_0^T) R_0 J_{10}^{(i)})$$

$$= \sum_{i=1}^{n_1} (m_i J_{1P}^{(i)T} J_{1P} + J_{10}^{(i)T} R_i I_i R_i^T J_{10}^{(i)}),$$

Conservative forces such as gravity is omitted here since they are taken care of by the robot controller, and therefore this proves that $\tilde{B}(q) := B_1(q) = B_2(q)$, hence $\tilde{C}(q, \dot{q}) := C_1(q, \dot{q}) = C_2(q, \dot{q})$, and we arrive at the conclusion that the dynamics of the arms are identical in q coordinates. Thus, as expected, the models of the master robot arm and the slave robot arm express the same dynamics.

To extend this approach to redundant robots, additional virtual constraints may be added. This allows impacting of all the DOF from either side, not only those required for maintaining the offset between end-effectors. Next, we show specifically how constraints in the joint space as well as on relative distances can be introduced. Assume $H_i$ is a matrix where each row has exactly one non-zero element corresponding to a redundant joint. Consequently, we write a constraint in the joint space as $$H_2 q_2 - H_1 q_1 = \Delta q, \tag{41}$$

where $\Delta q$ is a constant vector. By taking derivative of (41) w.r.t. time, we conclude $$H_2 \dot{q}_2 - H_1 \dot{q}_1 = 0 \tag{42}$$

Now, augmenting this constraint to (40) results in $$G = \begin{bmatrix} -J_1 & J_2 \\ -H_1 & H_2 \end{bmatrix}, \tag{43}$$

and the rest of the calculations remain the same as before. Thus, the constraint submodule 8 here defines a kinematic coupling between a joint of the master robot arm and a corresponding joint of the slave robot arm. The coupling may thus be defined by having a constant offset between joint values of a pair of joints, i.e. a joint of a master robot arm and a joint of the slave robot arm, as defined by equation (11). The control law may be extended with several pairs of kinematic coupling between joints as desired. The number of DOF of the arms limits the number of useful pairs.

In case of human-like robots, another approach can be to maintain the distance between the elbows. Assume $\Delta r := r_2 - r_1$ where $r_i$ is a vector to the elbow of arm i. Therefore, the constraint can be expressed as $\|\Delta r\| = d \in \mathbb{R}$. By differentiation with respect to time, we find $$\|\Delta r\| = d \Rightarrow \Delta r \cdot \Delta v = 0, \tag{44}$$

where $\Delta v$ is the relative velocity of the elbows. Rewriting (44) in terms of generalized coordinates, results in $$\Delta r \cdot \Delta v = \Delta r^T (J_{2P}^{(e)} \dot{q}_2 - J_{1P}^{(e)} \dot{q}_1) = \Delta r^T [-J_{1P}^{(e)} J_{2P}^{(e)}] \dot{q} = 0, \tag{45}$$

where $J_{iP}^{(e)}$ denotes the translational Jacobian with respect to the ith elbow. Therefore, matrix G should be augmented according to $$G = \begin{bmatrix} -J_1 & J_2 \\ -\Delta r^T J_{1P}^{(e)} & \Delta r^T J_{2P}^{(e)} \end{bmatrix}. \quad (46)$$

Thus, the constraint submodule 8 here defines a distance coupling between a coupling frame of the master robot arm and a respective coupling frame of the slave robot arm. The coupling may thus be defined by having a constant distance between a pair of coupling frames, i.e. a coupling frame of a master robot arm and a coupling frame of the slave robot arm, as defined by equation (44). Here, a coupling frame does not need to include the orientation. The control law may be extended with several pairs of distance between coupling frames as desired, for instance to let the operator use the hand of the master arm to influence a push motion by the slave arm elbow, or whatever is useful in the application within limits due to the DOF of the arms.

Joint limits can be handled by adding repulsive forces close to the limits. A physically motivated model for this purpose is the Hunt and Crossley model:

$$L(q,\dot{q}) = K\delta^n(1 + \tfrac{3}{2}c\dot{\delta}), \quad (47)$$

where $\delta$ is the amount of compression. However, such models may lead to numerically very stiff problems. Consequently, if the joint is pushed toward the direction of the joint limit despite the repulsive force, numerical issues might arise. Therefore, as soon as a joint reaches zero velocity by the repulsive forces, if $\delta > 0$, we can add a zero velocity constraint to the joint. This constraint is relaxed when the constraint force is in the direction toward the joint limit. For each active constraint, a row with one in the column where the joint has reached its limit and zeros elsewhere is augmented to G, i.e.

$$G_{c_i, j} = \begin{cases} 1, & \text{if } j = i \\ 0, & \text{otherwise} \end{cases}, \quad (48)$$

where i is the joint that has hit its limit and $c_i$ denotes the row number associated with this constraint. Using reinitialisation of the states, it is permissible to bring the reference velocity of the joints to zero immediately. Therefore, repulsive forces may not be required for the position-controlled robots, if the states are reinitialised as soon as a joint limit is reached.

Both in case of a haptic device and in many industrial setups it is beneficial (e.g., due to cost, availability, and safety) to allow the master and slave robots to be of different types. This is important also in the case of a dual arm robot since end-effectors, configurations, asymmetries of the mechanics, and the workcell arrangement typically forms a setup in which two arms of the same type in practice behave as two arms of somewhat different types. The disclosure handles both the more challenging case of arms being of different types, and the special case with identical robots.

An arm being a master robot arm does not mean it cannot take part in the operation; it means it is commanded by the human operator. Hence, when instructing a dual-arm assembly operation, the master robot arm can hold the workpiece while the slave robot arm is actively force controlled to exert those forces commanded by the operator. In this special case, however, the existence of the physical interaction force need to be taken into account within the motion/force control, and the force/torque relationship between the master robot arm and the slave robot arm (via forces acting on the workpiece) can be determined and monitored if there are force sensing (or estimation from motor torques) on each arm. From trivial mechanics it follows that it must then be known what arm the operator physically acts on for the desired force to be uniquely defined for a subsequent automatic operation where the (formerly during instruction) slave robot arm is to be force controlled for performing the desired operation while the other (formerly master) robot arm is holding the workpiece. Alternatively, the force control can also be split over the arms, for instance for reduced sensitivity considering friction effects in combination with the kinematic configuration and joint velocities.

Another special case is the use of the invention on a single arm with force/torque control of the instructed operation using dual force-sensing/estimation. For example, one force/torque sensor is then arranged to sense the operator force interaction and one force/torque sensor is arranged to sense the end-effector force. That is, as in the previous case of dual-arm operations, the system 1 must monitor and control the forces to the end-effector (e.g., to the end-flange of the arm where the end-effector is mounted, possibly using estimation from motor torques), separated from a known physical contact between the end-effector (or the end-flange; the same physical body as the slave forces act on) onto which a force/torque sensor (measuring the master human command forces) must be fitted. The skilled person can build such a dedicated/limited solution from existing technologies, but it will then by principles be bound to such a single-arm configuration. Instead, to provide portability to the mentioned more generic situations, the method, system and algorithms according to the present invention extends to generic cases of great industrial value while supporting the single arm case as a special case. For brevity only the generic case is covered in the following description of immersive kinesthetic teaching.

A teleoperation framework with haptic feedback is part of the teaching system. An operator is able to perceive what a robot would perceive, hence enabling him/her to accurately and intuitively program the procedure required to achieve a task while maintaining awareness of the limitations of the mechanisms. One of the available arms (or a temporary teaching arm) is used as a haptic device via an integrated module that supports the user. It also affects what properties of the motion that should be integrated into the robot instructions. Both interaction forces and motion control signals are recorded, such that they can be segmented and interpreted to form a program or program settings.

According to some embodiments, the system 1 is configured to record the commanded joint movement and the slave external force data of the slave robot arm. For example, the recorded signals can be stored in the memory unit 5B of the control unit 5. The system 1 may further be configured to determine a robot program or robot instructions based on the recorded resulting movement expressed in the frame related to the slave robot arm, and based on the recorded resulting/applied force to the workpiece in the same frame. The robot program for example comprises at least one set of instructions. The establishment of a robot program may include segmentation, which uses the recorded signals and optionally input from the operator for establishing the connection to the application for determining specific robot instructions, which can be of the sort found in industrial robot languages. The program can also activate hybrid force/motion controllers for playing back the generated trajectory. For example in Siciliano, Bruno, Khatib, Oussama (Eds.): "Springer Handbook of Robotics", 2nd ed., Chapter "Learning from Humans" by Billard, Aude G. (et al.), Pages 1995-2014, year 2016, it is explained a possible way how to create robot instructions from recorded data.

In some embodiments, the haptic interface module 7 is configured to map at least one restriction on the slave robot arm into at least one intuitive force reaction, which the control unit 5 is configured to reproduce as haptic feedback to the master robot arm. For example, it may be the case that the intuitive force reactions corresponds to a direct kinematic coupling over a common workpiece. Specifically, the master robot arm and the slave robot arm are then acting on the same common workpiece, thus common to the master robot arm and the slave robot arm. Typically, each arm is equipped with an end-effect such as the gripper 17, and the grippers both hold onto the one and same workpiece such as the workpiece 4. For such a shared workpiece there is a plurality of feasible force interplay combinations, arising from the possible combinations of the one restriction to the slave robot arm, of the interaction point for the one intuitive force reaction, the redundancy of the kinematic chain formed by the two arms over the shared workpiece, and the force reaction between the workpiece and the environment in case they are in contact with each other. Since the resulting load case follows from Newton's laws and the principles of the present innovation, is straightforward for the skilled person to configure the controller 5 and/or to request operator input such that

- the kinematic properties of all arms are known;
- workpiece properties can be known, or otherwise known to be unknown and then activate load identification and/or request data from the user;
- the slave robot arm restriction can be known or determined by identification (as existing in products today) or via requested user input;
- the one intuitive force reaction that is reproduced as haptic feedback to the master robot arm is known, either from force estimation with respect to a well-known point or link, or from additional force sensing as for the single arm special case.

As can be understood from the above description of the system 1, multi-arm/hand manipulation of a common workpiece is a special case of the invented method, which is further detailed in the following.

In some embodiments, the intuitive force reactions correspond to a direct kinematic coupling over a common virtual workpiece. The common virtual workpiece refers to a model of the common workpiece. In some embodiments, the kinematic coupling is accomplished by means of Cartesian-space control, which is an informative case that will be explained first.

In the Cartesian-space approach, the end-effectors of both arms represent the same entity, although there might exist an arbitrary, yet fixed, amount of offset in their positions and orientations. In other words, if the initial offset is removed, we can assume that the manipulators interact with the same object at the same point simultaneously. Accordingly, the forces F and torques r on this virtual object is the sum of the interaction forces from each arm:

$$F = F_1 + F_2, \quad (49)$$

$$\tau = \tau_1 + \tau_2, \quad (50)$$

where indices refer to the arms. Assuming that the virtual object is solid, the motion of the object is governed by:

$$F = m\dot{v} - Dv, \quad (51)$$

$$\tau = I\dot{\omega} - D_o\omega. \quad (52)$$

Here m is the mass, D is the viscous friction, I is the inertia tensor, $D_o$ is the rotational damping, v is the velocity, and $\omega$ is angular velocity.

For each arm, the resulting joint motion is the joint-space is obtained by:

$$\dot{q}_1 = J_i^\dagger(q_i) \begin{pmatrix} v \\ \omega \end{pmatrix}, \quad (53)$$

$$q_i = \int_0^\tau \dot{q}_i dt + c_i, \quad (54)$$

where $q_i$ denotes the joint angles of arm i, $c_1$ is the initial joint value, $J_i^\dagger(q_i)$ denotes the pseudo-inverse of the Jacobian at given joint angles. The joint angles and velocities are fed to the internal robot controller.

In this Cartesian-space approach, no attention to internal dynamics has been paid. For example, for redundant robots, it may not be possible to achieve a desired configuration for an arm just by interacting with the end-effector. Therefore, to arrive at a complete industrially useful system, the next step is to also have a joint-space solution for fulfilling the motion constraints. Motion constraints here includes both geometric constraints and kinematic constraints, typically stemming from the application and from the robot itself, respectively. Here, estimation of the torques in each joint can be directly used when there is no wrist-mounted force/torque-sensor.

Denoting the estimated torque by $\hat{\tau}$, an admittance control law for the robot is described as below:

$$M\ddot{q}^a = \hat{\tau} - D\dot{q}^a \quad (55)$$

Here $q^a$ is the reference joint angle due to the admittance law, M is the desired mass matrix and D corresponds to the desired damping. The motion of the arms in Cartesian space must be equal. According to the motion constraints, it means that:

$$J_1\dot{q}_1 = J_2\dot{q}_2 \quad (56)$$

We can assume that the motion of each arm consists of a contribution from the local admittance regulator $\dot{q}_i^a$ and the motion induced by the other arm $\dot{q}_{j \to i}$. Therefore, we can write:

$$\dot{q}_1 = \dot{q}_{2 \to 1} + \dot{q}_1^a \quad (57)$$

$$\dot{q}_2 = \dot{q}_{1 \to 2} + \dot{q}_2^a \quad (58)$$

Substituting (57) and (58) into (56), we find:

$$J_1\dot{q}_{2 \to 1} + J_1\dot{q}_1 = J_2\dot{q}_{1 \to 2} + J_2\dot{q}_2^a \quad (59)$$

A choice which makes this equality true is:

$$\dot{q}_{1 \to 2} = J_2^\dagger J_1 \dot{q}_1^a \quad (60)$$

$$\dot{q}_{2 \to 1} = J_1^\dagger J_2 \dot{q}_2^a. \quad (61)$$

Another choice can be, for example, finding $\dot{q}_{1 \to 2}$ and $\dot{q}_{2 \to 1}$ such that to minimize $\|\dot{q}_{1 \to 2}\| + \|\dot{q}_{2 \to 1}\|$ for some norm. Since these relations are on the velocity level, a drift in the relative position and orientation might occur. Assuming one robot is the master and the other one is the slave, this can be corrected by closing the loop for the position and orientation of the slave.

Another possibility is to mirror the motion of the arms. This implies $v_{1,y}=-v_{2,y}$, $\omega_{1,y}=-\omega_{2,y}$, $\omega_{1,z}=-\omega_{2,z}$ where indices refer to arms and the components of translational velocities, v, and angular velocities, ω. Applying these changes to (56), we obtain:

$$J_1\dot{q}_1 = SJ_2\dot{q}_2 \quad (62)$$

where the matrix S is defined as:

$$S := \text{diag}(1,-1,1,1,-1,-1). \quad (63)$$

A possible solution for the induced velocities in this case is:

$$\dot{q}_{1\to 2} = J_2^\dagger SJ_1\dot{q}_1{}^a \quad (64)$$

$$\dot{q}_{2\to 1} = J_1^\dagger SJ_2\dot{q}_2{}^a. \quad (65)$$

Figure 4:
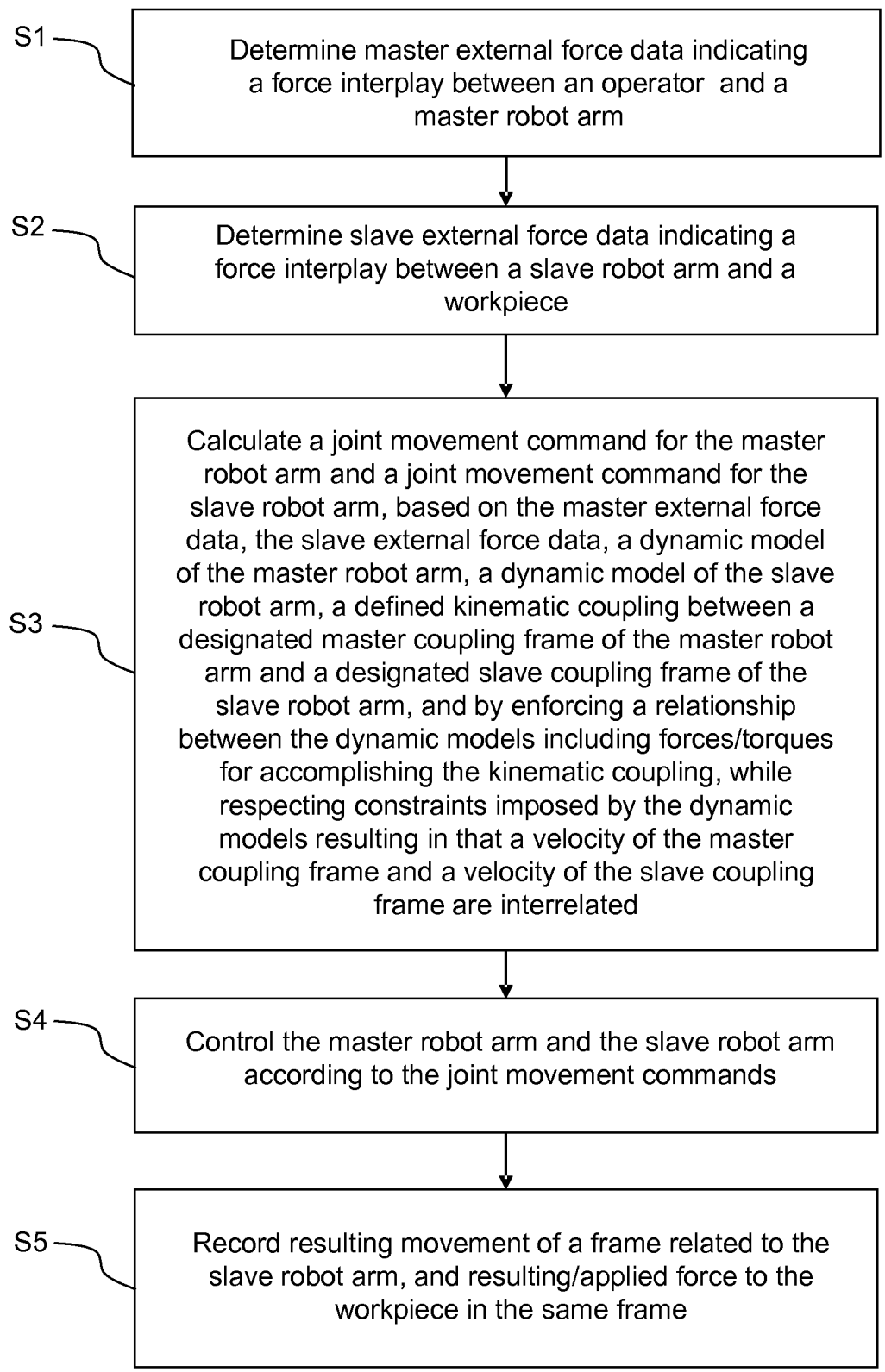
FIG. 4 illustrates a flow chart of a method according to some embodiments.

FIG. 4 illustrates a flow chart of a method for instructing the robot 10 according to some embodiments. The method will now be described with reference to this flow chart. The method may be implemented as a computer program with instructions or computer program code, and loaded into the memory unit 5B of the control unit 5. When the processor 5A executes the computer program, the method can be implemented by the robot 10 and an operator 6, and thus the system 1. In other words, the disclosure also relates to a computer program, wherein the computer program comprises a computer program code to cause the control unit 7, or a computer or controller connected to the control unit 7, to perform the method as described herein. The computer program code may be stored on a computer-readable medium to perform the method according to any of the steps described herein, when the computer program code is executed by a control unit 7 or by a computer connected to the control unit 7.

The method is here generally explained, but it is understood that the method can be used for instructing or teaching the robot a certain task. The task may include force interaction with a workpiece, e.g. the workpiece 4 illustrated in FIG. 1. Initially, the operator or the system 1 may define at least one pair of designated coupling frames as has been previously described. For that purpose the operator may set the system 1 in a "setting up interaction frames mode". The definition may however be predefined to the system 1, e.g. saved in the memory 5B. The system 1 is then set to an "activated instruction mode", where the master robot arm is arranged for being influenced by operator interaction, and the slave robot arm is arranged for interaction with a workpiece. The master robot arm is now configured to act as a haptic interface between the operator and the slave robot arm. The method comprises in a step S1 to determine master external force data indicating a force interplay between the operator and the master robot arm, e.g. the operator 6 and the first robot arm 2 of FIG. 1. The method comprises in a further step S2 to determine slave external force data indicating a force interplay between the slave robot arm and the workpiece, e.g. the workpiece 4 in FIG. 1. The slave robot arm may e.g. be the second robot arm 3 of FIG. 1. The described steps may be performed simultaneously and continually, and not in a specific order. The step S1 and S2 e.g. comprises that new measurements from the observers 21, 31 (FIG. 3) are obtained. The method comprises in a further step S3 to calculate a joint movement command for the master robot arm and a joint movement command for the slave robot arm, e.g. using a solver, and based on: the master external force data, the slave external force data, a dynamic model of the master robot arm, a dynamic model of the slave robot arm, and a defined kinematic coupling between a designated master coupling frame of the master robot arm and a designated slave coupling frame of the slave robot arm, and by enforcing a relationship between the dynamic models including forces/torques for accomplishing the kinematic coupling while respecting constraints imposed by the dynamic models, resulting in that a velocity of the master coupling frame and a velocity of the slave coupling frame are interrelated. For example, the velocities are defined to be the same, within a margin; or defined to be mirrored; or defined to be scaled etc. In particular, the step S3 may comprise monitoring joint limits and other unilateral constraints, and if encountered, the corresponding constraints are activated to the dynamic system. In one implementation with constraints expressed symbolically in a declarative manner, the constraints can be automatically added to the calculation by means of a suitable solver. The solver simulates forward in time the coupled dynamical system, specified e.g. with equations (15) and (16), and forces/torques e.g. equation (29) needed to maintain kinematic constraints, specified e.g. with equations (1) and (2), implemented as G in equations (15) and (16), are calculated. It may also be checked if all constraints are still valid, and if not, they are relaxed or deactivated, or in the mentioned declarative case even removed in case the system has changed physically. The joint movement commands comprise new joint positions q and Velocities q̇ or motor torques r. The method comprises in a further step S4 to control the master robot arm and the slave robot arm according to the joint movement commands. This step comprises that the new joint positions q and velocities q̇ are sent to the low-level robot controller 16 or controllers for controlling the master robot arm and the slave robot arm. The operator then receives haptic feedback from the force interplays reflecting dynamics of the master robot arm and/or dynamics of the slave robot arm.

In a step S5 the method further comprises recording the resulting movement of a frame related to the slave robot arm, and recording the resulting/applied force to or onto the workpiece 4 in the same frame. These recordings may be compiled into a program with target coordinates that the slave robot arm 3 should/can follow.

In the case that deformable objects should be manipulated, the deformations need to be sensed/observed and used for estimating the involved forces, but in the here assumed (for clarity simplified) case of rigid objects, the external forces are estimated and a rigid body model of the robot is simulated. The generated motion then provides the references to the real robot. To accommodate various couplings and constraints, we make use of dynamic constraints, e.g. force constraints or torque constraints. Especially in case of a dual-arm lead-through interface, we may express a constraint which ensures that e.g. both end-effectors of the master robot arm and the slave robot arm have the same translational and angular velocities. This constraint is e.g. a coupling between a coupling frame of the master robot arm and a coupling frame of the slave robot arm. The coupling may be defined in terms of relative position and/or orientation, distance coupling of a pair of frames or coupling of a pair of joints of a master robot arm and slave robot arm. To accomplish the physical effect of the constraint, thus the coupling between the pair of frames, virtual forces/torques are calculated. In other words, in some embodiments, the calculating of step S3 comprises determining at least one virtual/calculated force needed to maintain motion constraints on the master robot arm and/or on the slave robot arm, and determining the joint movement command for the master robot arm, and the joint movement command for the slave robot arm also based on the at least one virtual force. This may be accomplished by determining a solution to a system of differential-algebraic equations defining a relation between dynamics of the system and the forces and/or torques needed to accomplish the kinematic coupling while the constraints imposed by the dynamic models are respected, and using the solution to calculate the joint movement command for the master robot arm and the joint movement command for the slave robot arm. The calculating S3 may further include calculating the solution comprising the forces and/or torques needed to accomplish the kinematic coupling while the constraints imposed by the dynamic models are respected.

In some embodiments, in addition to accomplishing the coupling between a pair of coupling frames (which may be extended to several pairs), the calculating comprises calculating the joint movement command for the master robot arm and the joint movement command for the slave robot arm based on the plurality of, thus additional, motion constraints such that a corresponding constrained motion is accomplished, while constraints imposed by the dynamic models are respected. The additional motion constraints are here any of e.g. joint limits, coupling of a pair of joints and task constraints. For example, the calculating comprises determining the at least one virtual force needed to also maintain motion constraints in any kinematic configuration.

While the operator is instructing the slave robot arm via the master robot arm, data is preferably collected such that a program subsequently can be determined, the program being such that the slave robot arm can execute it in order to independently perform the task. To accomplish that, the method comprises recording the determined joint movement command and recording the slave external force data of the slave robot arm. Additionally, in some embodiments the method comprises determining a robot program or robot instruction based on the recorded resulting movement expressed in the frame related to the slave robot arm, and based on the recorded resulting/applied force to the workpiece in the same. The robot program may for example comprise at least one set of instructions.

In an exemplary embodiment the method comprises determining the master external force data based on joint motion data and/or joint position data of at least one joint of the master robot arm, and/or determining the slave external force data based on joint motion data and/or joint position data of at least one joint of the slave robot arm, as explained in connection with description of the system 1. The method may comprise obtaining the external force data from a torque sensor and/or motor signal data from the master robot arm or the slave robot arm, respectively, as explained in connection with the description of the system 1.

The method may comprise accomplishing a bidirectional transfer of force and torque between the master robot arm and the slave robot arm such that haptic feedback is complied with, or adjusted, according to any restricted and/or singular configurations of the master robot arm and/or the slave robot arm. The method enable an immersive experience for the operator which can intuitively manoeuvre the slave robot arm via the master robot arm acting as a haptic joystick to the operator.

According to some embodiments, the method comprises mapping at least one restriction of the slave robot arm into at least one intuitive force reaction and reproducing the intuitive force reaction as haptic feedback to the master robot arm. The intuitive force reaction may correspond to a direct kinematic coupling over a common workpiece 4. The method may comprise accomplishing the kinematic coupling with Cartesian-space control as has been previously described. Alternatively, the method may comprise accomplishing the kinematic coupling with joint-space control as previously described.

In the following a usage scenario will be described, when the method is applied to the robot 10 illustrated in FIG. 1. At first, the end-effectors 11, 17 of the first arm 2 and the second arm 3, respectively, are defined to the haptic interface module 7 as the designated coupling frames between which a kinematic coupling is defined such that their velocities are interrelated. Thereafter the additional motion constraints of the system 1 are adjusted. This may be done automatically by the system 1, or manually by the operator via a user interface to the system 1. Additional motion constraints are e.g. joint limits, direction of motion etc. Also the dynamic parameters of the system 1 are adjusted. This may be done automatically by the system 1 or manually by the operator. Dynamic parameters are, e.g., desired friction, gravity load, mass and moment of inertia etc. Now the system 1 is ready to be used. The teaching mode is activated, and each arm is moved individually to its initial configuration. The operator activates the synchronized motion, by acting upon the teach handle 11 by force, and leads the slave robot arm through a trajectory in a demonstration. The operator may alternatively activates the synchronized motion through the control unit 5 or a button on the teach handle 11. In other cases, the system may implement a specific force signature like two times tapping on the tech handle 11 or similar etc. in order not to confuse it with the movements of an individual arm. Meanwhile, the system 1 record trajectories and forces from the demonstration. The system 1 thereafter extract parameters from the demonstration into a set of instructions that the controller of the slave robot arm can interpret. When the demonstration session is over, the operator turns off the teaching mode of the system 1, typically via a user interface of the control unit 5.

Specific Use Cases:
  I. Teaching an assembly task and recoding interaction forces:
     An assembly task involves a number of subtasks, each requires achieving certain position and force criteria. The operator uses the master robot arm to demonstrate the motion and required forces. The slave robot arm follows the motion of the master arm and provides haptic feedback to the operator.
  II. Demonstrate forces required for milling or deburring:
     In machining tasks such as milling and deburring, the contact forces play an important role. By using the actual robot (as the slave robot arm) as part of the demonstration and providing haptic feedback to the operator, the required forces can be intuitively but accurately specified in the program.
  III. Programming coordinated arm movements:
     Sometimes, more than one robotic arm is used and the movements of the arms are not independent. For example, when carrying a box, the movements have a fixed relation imposed by the box. As another example, a robotic cell can consist of several robots mirroring each other's movements. In such scenarios, one of the robots or an additional teaching arm can be employed to instruct the task to the other robots.
  IV. Haptic interface for a real robot or a virtual mechanism:
     In this case, the user is interested to operate a robot remotely or use a device to control a mechanism in virtual reality. Since the dynamics are considered in our approach, the physical properties of the robot being controlled are sensed in the form of haptic feedback by the operator. Scaling of the motion or defining a motion constraint make it also possible to more accurately control the slave robot. The virtual simulator can also be used for programming the robot for tasks requiring force interaction when there is no access to the real setup.

Common to all use cases is the following sequence. The user defines the master and slave frames. Then, the kinematic constraints such as the kinematic coupling, and additional constraints such as joint limits, direction of motion, etc. are adjusted. The user can optionally adjust dynamic parameters of the system, desired friction, gravity load, masses and moments of inertia. After this, the teaching mode of the system is activated. Each robot arm can be moved individually to its initial configuration. By activating the dual-arm lead through, the arms move in synchrony, while the operator receives haptic feedback. In this mode, trajectories and forces are recorded and relevant parameters to the task are extracted from demonstration.

The system makes it possible to distinguish between interaction forces between the robot and the workpiece and the forces used for teaching. Therefore, the required forces for a task can easily be reconstructed. The haptic feedback can also reflect the dynamical properties and limitations of the slave robot arm, hence helping the operator to adjust the movements accordingly. Additionally, the system is not restricted to any robot kinematics. For example, master and slaver robots may have different numbers of joints.

The present disclosure is not limited to the above-described preferred embodiments. Various alternatives, modifications and equivalents may be used. Therefore, the above embodiments should not be taken as limiting the scope of the disclosure, which is defined by the appending claims.

The invention claimed is:

1. A system, comprising:
a robot having a master robot arm configured for being operably influenced by interaction with an operator; and a slave robot arm, configured for interaction with a workpiece; and
a control unit configured to determine master external-force data indicating a force interplay between the operator and the master robot arm, and to determine slave external-force data indicating a force interplay between the slave robot arm and the workpiece;
wherein the control unit further comprises a haptic interface module, comprising:
a constraint submodule defining a plurality of motion constraints including a kinematic coupling in a task space between a designated master coupling frame of the master robot arm and a designated slave coupling frame of the slave robot arm, such that a velocity of the master coupling frame and a velocity of the slave coupling frame are interrelated in the task space; and
a calculation submodule configured to calculate a joint movement command for the master robot arm and a joint movement command for the slave robot arm, based on the master external-force data, the slave external-force data, a non-linear dynamic model of the master robot arm, a non-linear dynamic model of the slave robot arm, a relationship between the non-linear dynamic model of the master robot arm and the non-linear dynamic model of the slave robot arm including virtual forces or torques at the designated master coupling frame and the designated slave coupling frame for the kinematic coupling in the task space, and based on at least one virtual force or virtual torque needed to enforce the plurality of motion constraint, while preserving constraints imposed by the non-linear dynamic models of the master robot arm and the slave robot arm;
wherein the system is configured to:
control the master robot arm and the slave robot arm according to the joint movement commands, wherein during instruction of the robot, haptic feedback from the force interplay between the operator and the master robot arm and the force interplay between the slave robot arm and workpiece reflecting dynamics of the system is provided to the operator.

2. The system according to claim 1, wherein the system is configured to record resulting movement of a frame related to the slave robot arm, and to record a resulting or applied force onto the workpiece in the same frame.

3. The system according to claim 2, wherein the system is configured to determine one of a robot program and a robot instruction based on the recorded resulting movement expressed in the frame related to the slave robot arm, and based on the recorded resulting or applied force to the workpiece in the same frame.

4. The system according to claim 1, wherein the calculation submodule is configured to determine a solution to a system of differential-algebraic equations defining a relation between dynamics of the system and forces or torques needed to accomplish the kinematic coupling while the constraints imposed by the dynamic models are respected, and to use the solution to calculate the joint movement command for the master robot arm and the joint movement command for the slave robot arm.

5. The system according to claim 1, wherein the master robot arm and the slave robot arm have dissimilar kinematics.

6. The system according to claim 1, wherein the master robot arm and the slave robot arm have dissimilar degrees of freedom.

7. The system according to claim 1, wherein the control unit is configured to calculate a joint movement command for at least one of another master robot arm and another slave robot arm without re-programming the control unit.

8. The system according to claim 1, wherein the master external-force data is determined based on at least one of joint motion data, joint position data, and motor signal data of at least one joint of the master robot arm, and wherein the slave external-force data is determined based on at least one of joint motion data, joint position data, and motor signal data of at least one joint of the slave robot arm.

9. The system according to claim 1, wherein the external-force data is obtained from at least one torque sensor.

10. The system according to claim 1, wherein the master external-force data is obtained from one of joint force data and motor signal data of at least one joint of the master robot arm.

11. The system according to claim 1, wherein the slave external-force data is obtained from one of joint force data and motor signal data of at least one joint of the slave robot arm.

12. The system according to claim 1, wherein the master robot arm is mechanically separated from the slave robot arm.

13. The system according to claim 1, wherein the slave robot arm is a virtual slave robot arm.

14. The system according to claim 1, wherein the haptic interface module is configured to map at least one restriction on the slave robot arm into at least one intuitive force reaction that the control unit is configured to reproduce as haptic feedback to the master robot arm.

15. The system according to claim 14, wherein the at least one intuitive force reaction corresponds to a direct kinematic coupling over a common workpiece that is common to the master robot arm and the slave robot arm.

16. A method for instructing a robot comprising:
   determining master external-force data indicating a force interplay between an operator and a master robot arm of a robot;
   determining slave external-force data indicating a force interplay between a slave robot arm of the robot and a workpiece;
   calculating a joint movement command for the master robot arm and a joint movement command for the slave robot arm based on (i) the master external-force data, the slave external-force data, a first non-linear dynamic model of the master robot arm, a second non-linear dynamic model of the slave robot arm, and a plurality of motion constraints including a defined kinematic coupling in a task space between a designated master coupling frame of the master robot arm and a designated slave coupling frame of the slave robot arm, by enforcing a relationship between the first and second non-linear dynamic models, including virtual forces or torques at the designated frames for accomplishing the kinematic coupling in the task space, while respecting constraints imposed by the first and second non-linear dynamic models, resulting in that a velocity of the master coupling frame and a velocity of the slave coupling frame are interrelated in the task space, and (ii) at least one virtual force or virtual torque needed for enforcing the plurality of motion constraints; and
   controlling the master robot arm and the slave robot arm according to the joint movement commands, wherein during instruction of the robot, the operator receives haptic feedback from the force interplay between the operator and the master robot arm and the force interplay between the slave robot arm and workpiece reflecting dynamics of at least one of the master robot arm and the slave robot arm.

17. The method according to claim 16, wherein the method further comprises recording (a) resulting movement of a frame relative to the slave robot arm, and (b) resulting or applied force to the workpiece in the same frame.

18. The method according to claim 16, wherein the calculating comprises determining a solution to a system of differential-algebraic equations defining a relation between dynamics of the system and the forces or torques needed to accomplish the kinematic coupling while the constraints imposed by the dynamic models are respected, and using the solution to calculate the joint movement command for the master robot arm and the joint movement command for the slave robot arm.

19. The method according to claim 16, wherein the method further comprises accomplishing a bidirectional transfer of force and torque between the master robot arm and the slave robot arm such that haptic feedback is complied with or adjusted according to any restricted and/or singular configuration of at least one of the master robot arm and the slave robot arm.

20. The method according to claim 16, wherein the calculating comprises:
   mapping at least one restriction to the slave robot arm into at least one intuitive force reaction; and
   reproducing the intuitive force reaction as haptic feedback to the master robot arm.

21. A non-transitory, computer-readable medium comprising instructions which, when executed by a control unit or a computer operatively connected to the control unit, cause the control unit to instruct a robot in accordance with a method comprising:
   determining master external-force data indicating a force interplay between an operator and a master robot arm of a robot;
   determining slave external-force data indicating a force interplay between a slave robot arm of the robot and a workpiece;
   calculating a joint movement command for the master robot arm and a joint movement command for the slave robot arm based on (i) the master external-force data, the slave external-force data, a first non-linear dynamic model of the master robot arm, a second non-linear dynamic model of the slave robot arm, and a plurality of motion constraints including a defined kinematic coupling in a task space between a designated master coupling frame of the master robot arm and a designated slave coupling frame of the slave robot arm, by enforcing a relationship between the first and second non-linear dynamic models, including virtual forces or torques at the designated frames for accomplishing the kinematic coupling in the task space, while respecting constraints imposed by the first and second non-linear dynamic models, resulting in that a velocity of the master coupling frame and a velocity of the slave coupling frame are interrelated in the task space, and (ii) at least one virtual force or virtual torque needed for enforcing the plurality of motion constraint; and
   controlling the master robot arm and the slave robot arm according to the joint movement commands, wherein during instruction of the robot, the operator receives haptic feedback from the force interplay between the operator and the master robot arm and the force interplay between the slave robot arm and workpiece reflecting dynamics of at least one of the master robot arm and the slave robot arm.

22. The non-transitory, computer readable medium according to claim 21, wherein the method further comprises recording (a) resulting movement of a frame relative to the slave robot arm, and (b) resulting or applied force to the workpiece in the same frame.

23. The non-transitory, computer readable medium according to claim 21, wherein the calculating comprises determining a solution to a system of differential-algebraic equations defining a relation between dynamics of the system and the forces or torques needed to accomplish the kinematic coupling while the constraints imposed by the dynamic models are respected, and using the solution to calculate the joint movement command for the master robot arm and the joint movement command for the slave robot arm.

24. The non-transitory, computer readable medium according to claim 21, wherein the method further comprises accomplishing a bidirectional transfer of force and torque between the master robot arm and the slave robot arm such that haptic feedback is complied with or adjusted according to any restricted and/or singular configuration of at least one of the master robot arm and the slave robot arm.

25. The non-transitory, computer readable medium according to claim 21, wherein the calculating comprises:
mapping at least one restriction to the slave robot arm into at least one intuitive force reaction; and
reproducing the intuitive force reaction as haptic feedback to the master robot arm.

* * * * *